US011063489B2

(12) United States Patent
Dameron et al.

(10) Patent No.: US 11,063,489 B2
(45) Date of Patent: Jul. 13, 2021

(54) FRACTIONAL SLOT ELECTRIC MOTORS WITH COIL ELEMENTS HAVING RECTANGULAR CROSS-SECTIONS

(71) Applicant: Canoo Technologies Inc., Torrance, CA (US)

(72) Inventors: James Dameron, Torrance, CA (US); Evan Filter, Long Beach, CA (US); Phillip Weicker, Los Angeles, CA (US); Charles Garmel, Los Angeles, CA (US)

(73) Assignee: Canoo Technologies Inc., Torrance, CA (US)

( * ) Notice: Subject to any disclaimer, the term of this patent is extended or adjusted under 35 U.S.C. 154(b) by 0 days.

(21) Appl. No.: 17/029,906

(22) Filed: Sep. 23, 2020

(65) Prior Publication Data

US 2021/0091612 A1 Mar. 25, 2021

Related U.S. Application Data

(60) Provisional application No. 62/904,502, filed on Sep. 23, 2019.

(51) Int. Cl.
*H02K 3/50* (2006.01)
*H02K 3/46* (2006.01)
(Continued)

(52) U.S. Cl.
CPC .................. *H02K 3/50* (2013.01); *H02K 1/16* (2013.01); *H02K 3/28* (2013.01); *H02K 3/46* (2013.01);
(Continued)

(58) Field of Classification Search
CPC .......... H02K 1/16; H02K 1/145; H02K 3/345; H02K 3/522; H02K 3/50; H02K 2213/03;
(Continued)

(56) References Cited

U.S. PATENT DOCUMENTS

| 1,560,308 A | 11/1925 | Perry |
| 7,348,705 B2 | 3/2008 | Cai et al. |

(Continued)

FOREIGN PATENT DOCUMENTS

| CN | 203522375 U | 4/2014 |
| CN | 105680585 A | 6/2016 |

(Continued)

OTHER PUBLICATIONS

International Application Serial No. PCT/US20/52249, Search Report and Written Opinion dated 12/10/20 7 pgs.

*Primary Examiner* — Quyen P Leung
*Assistant Examiner* — Alexander A Singh
(74) *Attorney, Agent, or Firm* — Kwan & Olynick LLP

(57) ABSTRACT

Described herein are fractional slot electric motors with compact crowns. A motor comprises multiple coil elements protruding through a stator core and forming electrical connections with each other and/or with a lead assembly. The lead assembly comprises phase busbars connected to selected coil elements and comprising terminals for connecting to an external power supply. The lead assembly also comprises neutral busbars, with no external connections and internally connected to other coil elements. Each coil element has a rectangular cross-sectional profile to maximize the slot-fill-ratio of the motor, Each coil element is electrically coupled to two other components. For example, each looped coil element is coupled to two other coil elements at a stator side, opposite the lead assembly. Each extended coil element is coupled to another coil element at that same side and coupled to another coil element or a busbar at the lead assembly side.

20 Claims, 26 Drawing Sheets

(51) Int. Cl.
*H02K 3/28* (2006.01)
*H02K 1/16* (2006.01)
*H02K 3/52* (2006.01)
*H02K 1/14* (2006.01)
*H02K 3/34* (2006.01)

(52) U.S. Cl.
CPC ............. *H02K 3/522* (2013.01); *H02K 1/145* (2013.01); *H02K 3/345* (2013.01); *H02K 2213/03* (2013.01)

(58) Field of Classification Search
CPC .. H02K 3/00; H02K 3/02; H02K 3/04; H02K 3/12; H02K 3/14; H02K 3/16; H02K 3/18; H02K 3/20; H02K 3/22; H02K 3/24; H02K 3/26; H02K 3/28; H02K 3/30; H02K 3/32; H02K 3/325; H02K 3/34; H02K 3/38; H02K 3/40; H02K 3/42; H02K 3/44; H02K 3/46; H02K 3/47; H02K 3/48; H02K 3/487; H02K 3/493; H02K 3/505; H02K 3/51; H02K 3/52; H02K 3/521; H02K 3/524; H02K 3/525; H02K 3/527; H02K 3/528; H02K 15/0056; H02K 15/0062; H02K 15/0068; H02K 15/0081; H02K 15/0464; H02K 15/064; H02K 15/0414; H02K 5/22; H02K 5/225
USPC ......... 310/200, 201, 202, 71, 203, 204, 205, 310/208
See application file for complete search history.

(56) References Cited

U.S. PATENT DOCUMENTS

| | | | |
|---|---|---|---|
| 2007/0018525 | A1* | 1/2007 | Cai ........................ B60L 7/14 310/184 |
| 2009/0127948 | A1* | 5/2009 | Shimizu .................. H02K 3/50 310/71 |
| 2011/0012466 | A1 | 1/2011 | Blissenbach et al. |
| 2013/0113313 | A1* | 5/2013 | Ikura ..................... H02K 3/522 310/71 |
| 2014/0167547 | A1 | 6/2014 | Hao et al. |
| 2014/0285054 | A1* | 9/2014 | Han ........................ H02K 3/12 310/201 |
| 2015/0022046 | A1* | 1/2015 | Shibata ................... H02K 3/12 310/208 |
| 2015/0137637 | A1* | 5/2015 | Jang .................... H02K 15/095 310/71 |
| 2016/0021772 | A1* | 1/2016 | Nakayama .......... H01M 10/615 361/728 |
| 2016/0181882 | A1* | 6/2016 | Iwaki .................... H02K 3/345 310/215 |
| 2018/0097416 | A1 | 4/2018 | Dang |
| 2020/0212747 | A1* | 7/2020 | Deng .................... H02K 1/165 |

FOREIGN PATENT DOCUMENTS

| | | |
|---|---|---|
| CN | 207251392 U | 4/2018 |
| CN | 209913599 U | 1/2020 |
| RU | 2661907 C1 | 7/2018 |
| WO | 2021061795 A1 | 4/2021 |

* cited by examiner

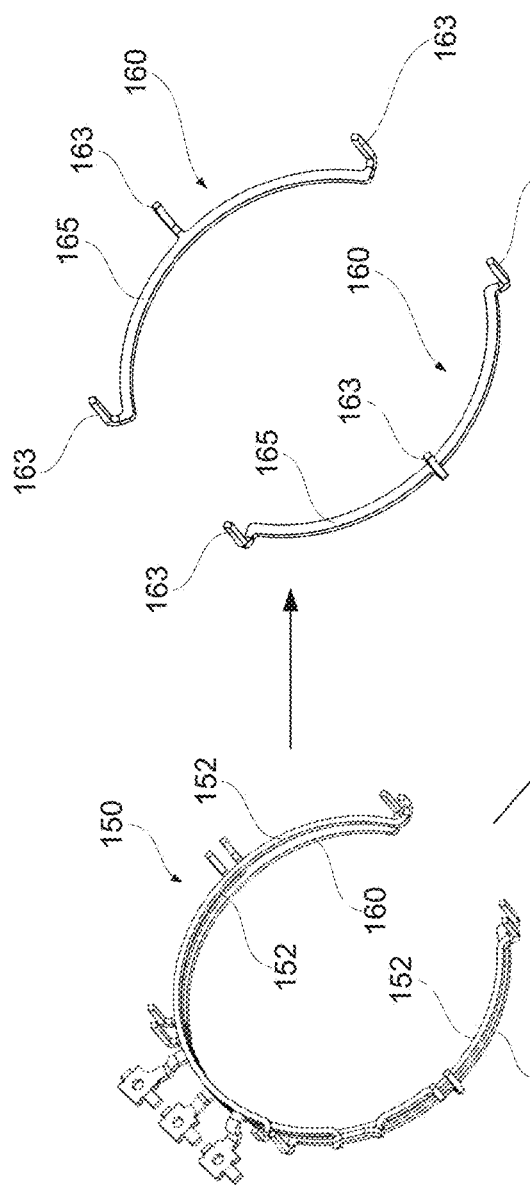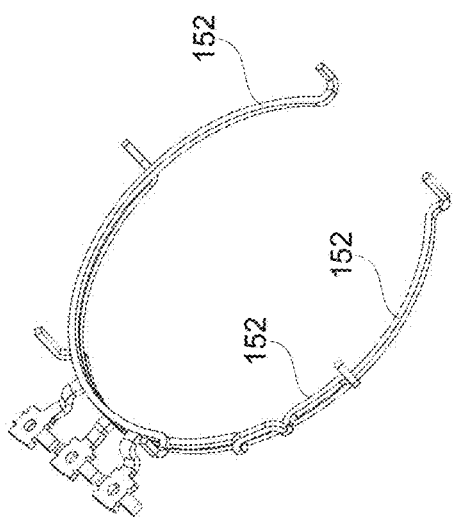

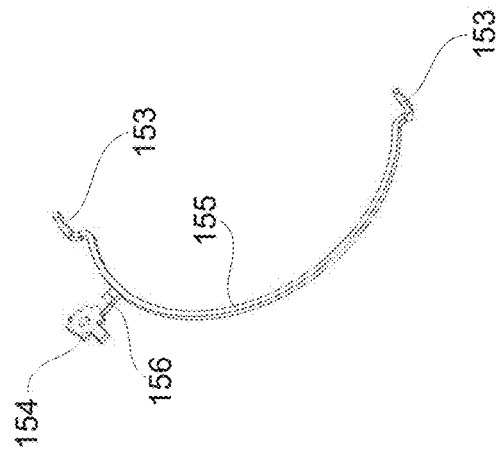
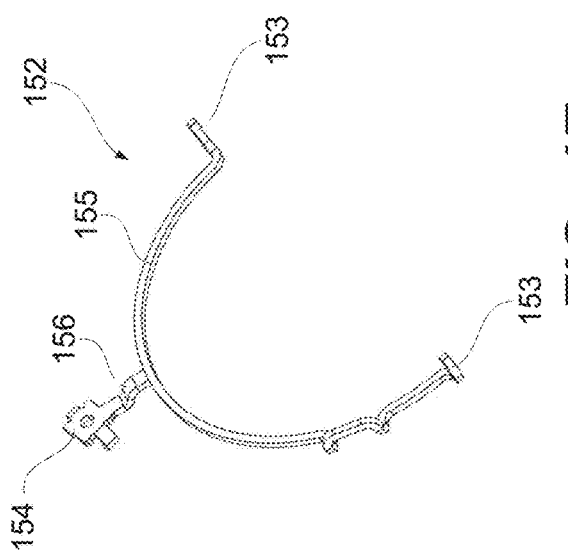
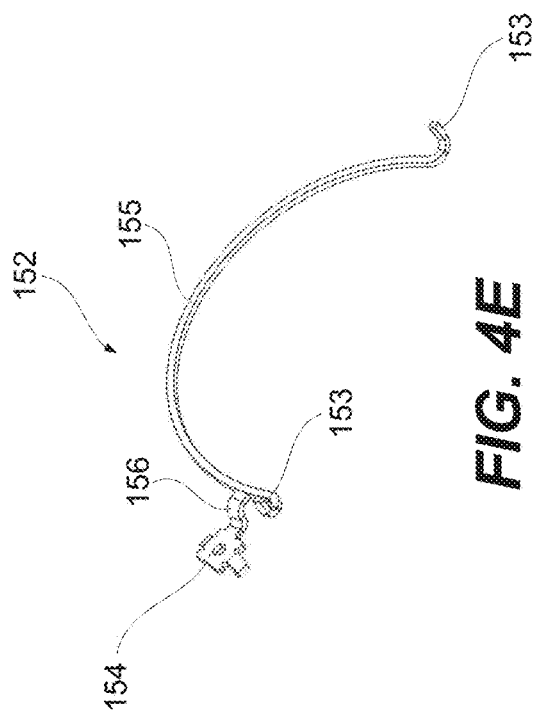

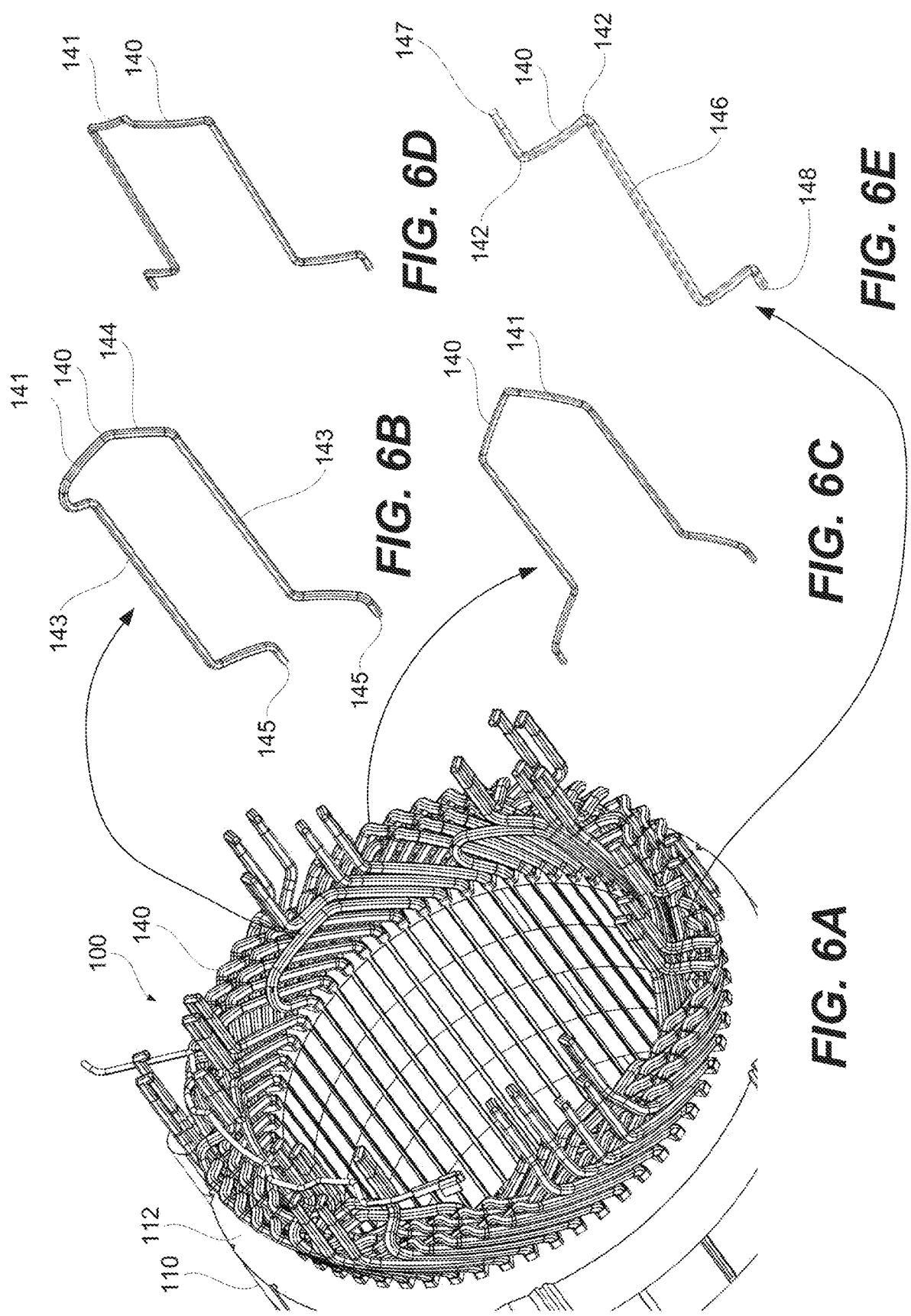

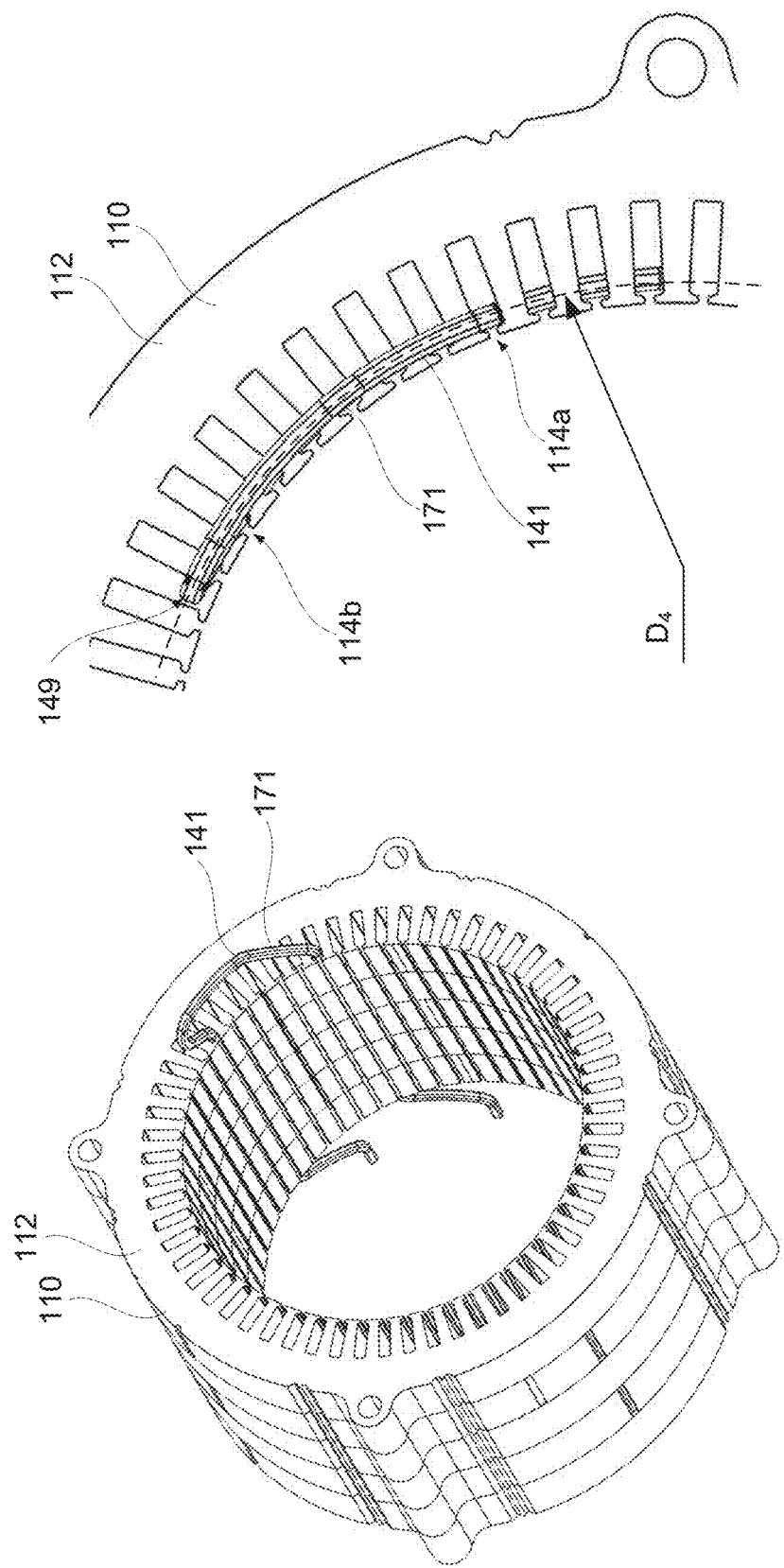

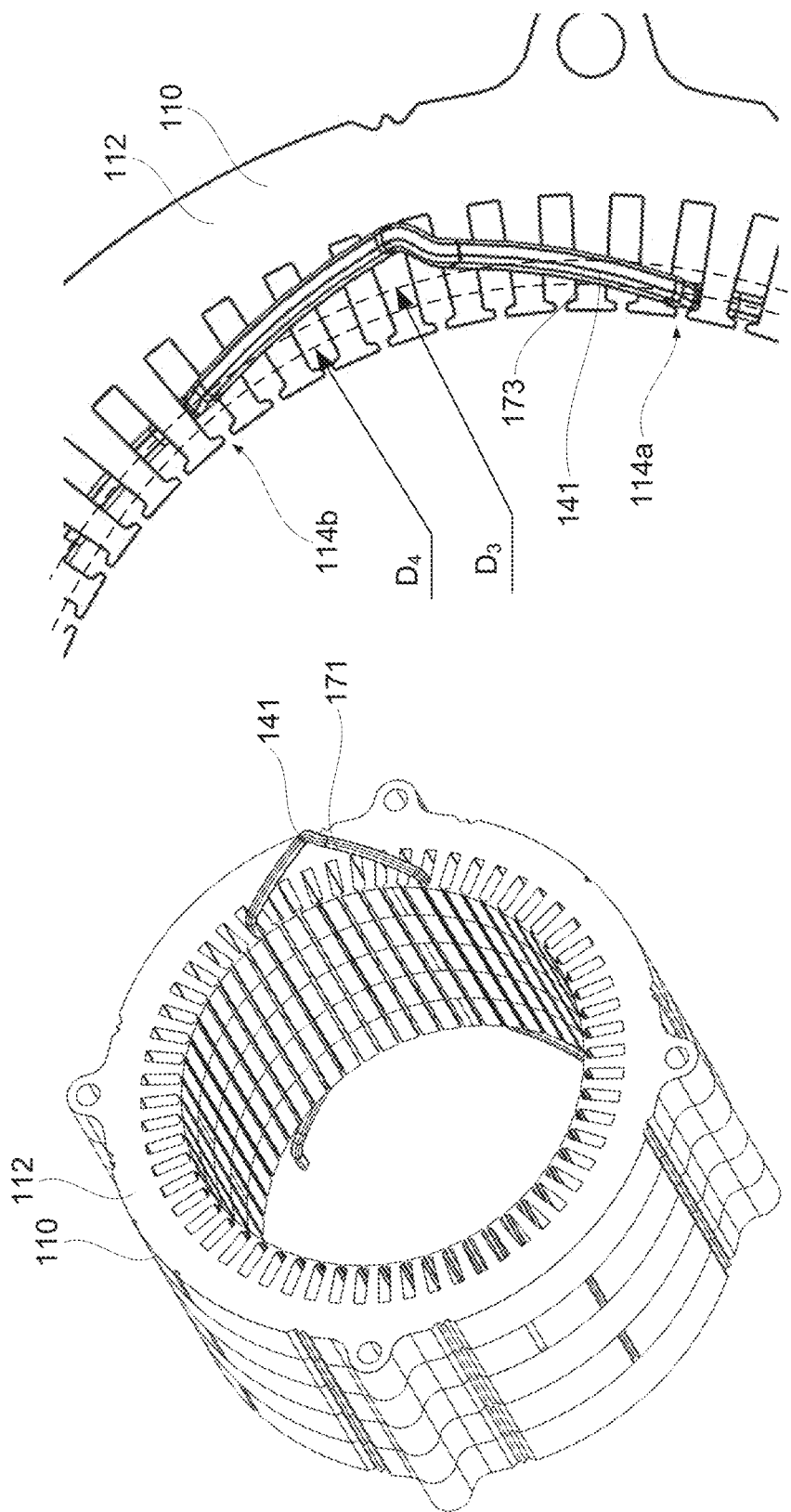

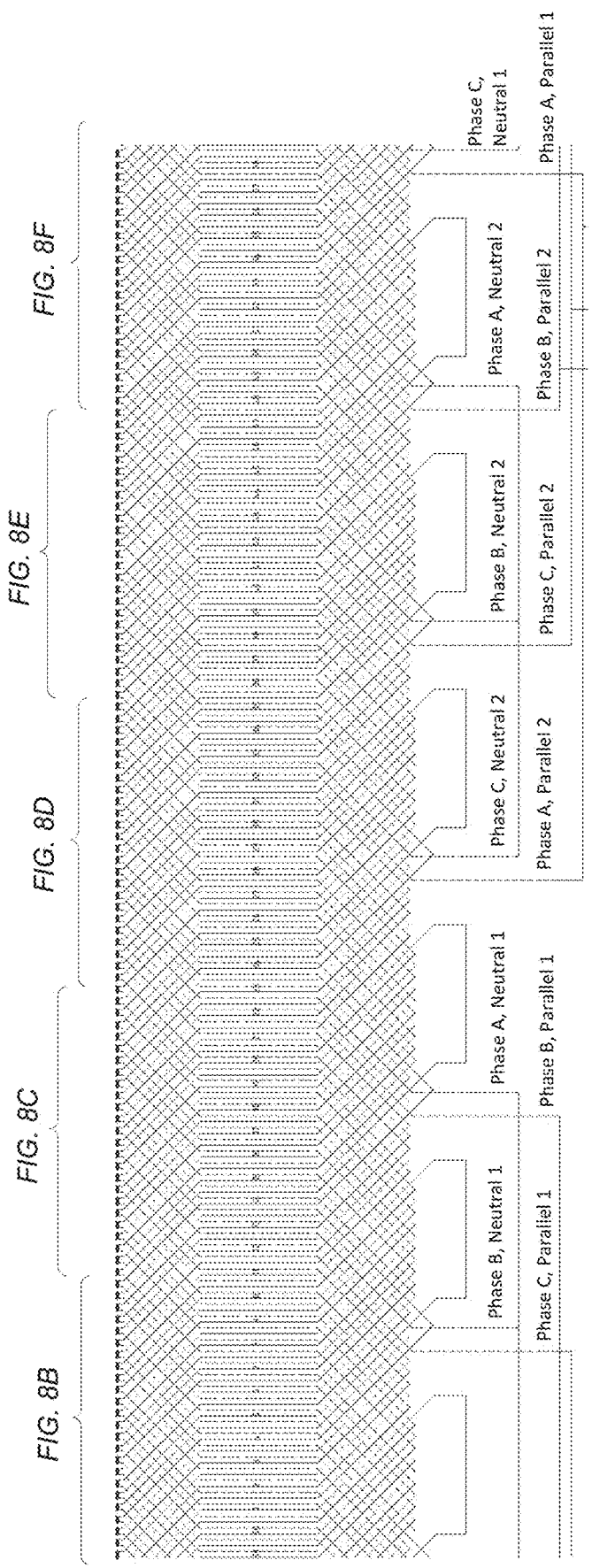

| Slot | 59 | 60 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| D | A2-35 | A2-27 | C1-24 | C1-16 | C1-8 | B1-33 | B1-25 | A2-22 | A2-14 | A2-6 | C2-35 | C2-27 | B1-24 | B1-16 | B1-8 |
| C | A2-21 | A2-13 | A2-5 | C2-36 | C2-28 | B1-23 | B1-15 | B1-7 | A2-34 | A2-26 | C2-21 | C2-13 | C2-5 | B2-36 | B2-28 |
| B | B2-4 | A1-39 | A1-31 | C2-20 | C2-12 | C2-4 | B2-37 | B2-29 | A1-18 | A1-10 | A1-2 | C1-39 | C1-31 | B2-20 | B2-12 |
| A | B2-30 | A1-17 | A1-9 | A1-1 | C1-40 | C1-32 | B2-19 | B2-11 | B2-3 | A1-38 | A1-30 | C1-17 | C1-9 | C1-1 | B1-40 |

| Slot | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|
| D | A2-33 | A2-25 | C2-22 | C2-14 | C2-6 | B2-35 | B2-27 | A2-24 | A2-16 | A2-8 | C2-33 | C2-25 | B2-22 | B2-14 | B2-6 |
| C | A2-23 | A2-15 | A2-7 | C2-34 | C2-26 | B2-21 | B2-13 | B2-5 | A1-36 | A1-28 | C2-23 | C2-15 | C2-7 | B2-34 | B2-26 |
| B | B2-4 | A1-37 | A1-29 | C1-18 | C1-10 | C1-2 | B1-39 | B1-31 | A1-20 | A1-12 | A1-4 | C1-37 | C1-29 | B1-18 | B1-10 |
| A | B1-32 | A1-19 | A1-11 | A1-3 | C1-38 | C1-30 | B1-17 | B1-9 | B1-1 | A2-40 | A2-32 | C1-19 | C1-11 | C1-3 | B1-38 |

| Slot | 29 | 30 | 31 | 32 | 33 | 34 | 35 | 36 | 37 | 38 | 39 | 40 | 41 | 42 | 43 |
|---|---|---|---|---|---|---|---|---|---|---|---|---|---|---|---|
| D | A1-35 | A1-27 | C2-24 | C2-16 | C2-8 | B2-33 | B2-25 | A1-22 | A1-14 | A1-6 | C1-35 | C1-27 | B2-24 | B2-16 | B2-8 |
| C | A1-21 | A1-13 | A1-5 | C1-36 | C1-28 | B2-23 | B2-15 | B2-7 | A1-34 | A1-26 | C1-21 | C1-13 | C1-5 | B1-36 | B1-28 |
| B | B1-2 | A2-39 | A2-31 | C1-20 | C1-12 | C1-4 | B1-37 | B1-29 | A2-18 | A2-10 | A2-2 | C2-39 | C2-31 | B1-20 | B1-12 |
| A | B1-30 | A2-17 | A2-9 | A2-1 | C2-40 | C2-32 | B1-19 | B1-11 | B1-3 | A2-38 | A2-30 | C2-17 | C2-9 | C2-1 | B2-40 |

| Slot | 44 | 45 | 46 | 47 | 48 | 49 | 50 | 51 | 52 | 53 | 54 | 55 | 56 | 57 | 58 |
|---|---|---|---|---|---|---|---|---|---|---|---|---|---|---|---|
| D | A1-33 | A1-25 | C1-22 | C1-14 | C1-6 | B1-35 | B1-27 | A1-24 | A1-16 | A1-8 | C1-33 | C1-25 | B1-22 | B1-14 | B1-6 |
| C | A1-23 | A1-15 | A1-7 | C1-34 | C1-26 | B1-21 | B1-13 | B1-5 | A2-36 | A2-28 | C1-23 | C1-15 | C1-17 | B1-34 | B1-26 |
| B | B1-4 | A2-37 | A2-29 | C2-18 | C2-10 | C2-2 | B2-39 | B2-31 | A2-20 | A2-12 | A2-4 | C2-37 | C2-29 | B2-18 | B2-10 |
| A | B2-32 | A2-19 | A2-11 | A2-3 | C2-38 | C2-30 | B2-17 | B2-9 | B2-1 | A1-40 | A1-32 | C2-19 | C2-11 | C2-3 | B2-38 |

*FIG. 9*

FRACTIONAL SLOT ELECTRIC MOTORS WITH COIL ELEMENTS HAVING RECTANGULAR CROSS-SECTIONS

CROSS-REFERENCE TO RELATED APPLICATIONS

This application claims the benefit under 35 USC § 119(e) of U.S. Provisional Patent Application No. 62/904,502, entitled: "Electric Vehicle Motors", filed on 23 Sep. 2019, which is incorporated herein by reference in its entirety for all purposes.

BACKGROUND

Electric motors are devices that convert electrical energy into mechanical energy. A typical electric motor operates through the interaction between the motor's magnetic field and the electric current in the wire winding to generate rotation forces. Electric motors can be powered by direct current (DC) sources (e.g., batteries, rectifiers) or by alternating current (AC) sources (e.g., power grid, inverters, or electrical generators). In general, electric motors may be classified based on power source types, internal construction, application, and motor output. For example, motors may be brushed or brushless. Furthermore, motors may be of various phases, e.g., a single-phase motor, a two-phase motor, or a three-phase motor.

A typical electric motor includes a rotor assembly, which rotates within a stator assembly. Both assemblies generate respective magnetic fields that interact with each other causing the rotor assembly to rotate relative to the stator assembly, thereby converting electrical energy into mechanical energy. A stator assembly includes a stator core having multiple slots with coil elements protruding through these slots and wound around the stator core. These elements may be collectively referred to as stator winding. Specifically, each stator slot may house multiple coil elements, arranged in a radial direction and away from the center axis of the stator core. Finally, routing, interconnecting, and assembly of coil elements in fractional slot motors are typically more challenging than in integer slot motors

SUMMARY

Described herein are fractional slot electric motors with compact crowns. A motor comprises multiple coil elements protruding through a stator core and forming electrical connections with each other and/or with a lead assembly. The lead assembly comprises phase busbars connected to selected coil elements and comprising terminals for connecting to an external power supply. The lead assembly also comprises neutral busbars, with no external connections and internally connected to other coil elements. Each coil element has a rectangular cross-sectional profile to maximize the slot-fill-ratio of the motor, Each coil element is electrically coupled to two other components. For example, each looped coil element is coupled to two other coil elements at a stator side, opposite the lead assembly, Each extended coil element is coupled to another coil element at that same side and coupled to another coil element or a busbar at the lead assembly side.

BRIEF DESCRIPTION OF THE DRAWINGS

The description will be more fully understood with reference to the following figures, which are presented as exemplary examples of the invention and should not be construed as a complete recitation of the scope of the invention, wherein:

FIG. 4B is a perspective view of the lead assembly in FIG. 4A without a busbar insulator, in accordance with some examples, FIG. 4C is a perspective view of two neutral busbars of the lead assembly in FIG. 4A and FIG. 4B, in accordance with some examples.

FIG. 4D is a perspective view of three stacked phase busbars of the lead assembly in FIG. 4A and FIG. 4B, in accordance with some examples.

FIG. 4E, FIGS. 4F, and 4G are individual perspective views of each of the three phase busbars in FIG. 4D, in accordance with some examples.

FIG. 6A is a perspective view of the fractional slot electric motor without a lead assembly, showing the orientation of coil elements at the second side of the stator core, in accordance with some examples.

FIG. 6B, FIG. 6C, FIG. 6D, and FIG. 6E are perspective views of selected individual coil elements in FIG. 6B, in accordance with some examples.

FIG. 7A is a perspective view of the stator core with one of the coil elements inserted into the core, in accordance with some examples.

FIG. 7B is a top view of a portion of the stator core in FIG. 7A, showing the shape of the coil element, in accordance with some examples.

FIG. 7D is a perspective view of the stator core with another one of the coil elements inserted into the core, in accordance with some examples.

FIG. 7E is a top view of a portion of the stator core in FIG. 7D, showing the shape of the coil element, in accordance with some examples.

FIG. 8A illustrates a stator wiring schematic, in accordance with some examples.

FIG. 9 illustrates a stator wiring table, in accordance with some examples.

DETAILED DESCRIPTION

In the following description, numerous specific details are outlined in order to provide a thorough understanding of the presented concepts. In some examples, the presented concepts are practiced without some or all of these specific details. In other instances, well-known process operations have not been described in detail so as not to unnecessarily obscure the described concepts. While some concepts will be described in conjunction with the specific examples, it will be understood that these examples are not intended to be limiting.

Introduction

Electrical motors are core components of various power systems, such as drive systems of electric vehicles. The space available for electrical motors is typically limited, while the power requirements can be substantial. Overall, high efficiency and small size are important considerations for many applications of electrical motors. One approach for reducing the size and increasing the efficiency of an electric motor is by increasing the volume of coils passing through the stator core of the motor. This volume is typically represented by a slot-fill-ratio (SFR), which is defined as a ratio of the total cross-sectional area of all coils passing through the stator core to the total cross-sectional area of all slots available for these coils. Increasing the SFR value helps to decrease the resistance of the windings, thereby decreasing power loss and increasing efficiency.

Figure 1A:
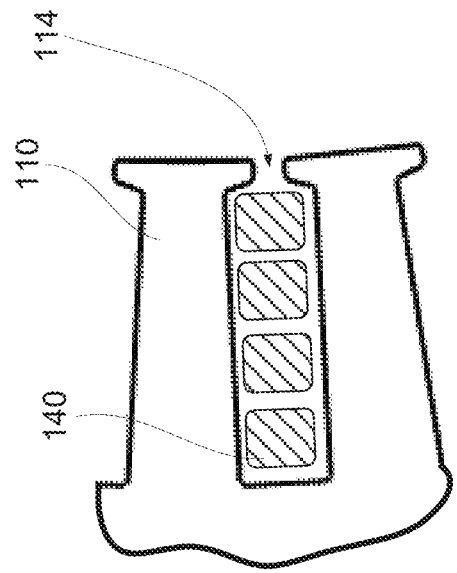
FIG. 1A is a schematic view of conventional coil elements, each having a circular cross-section, protruding through the same stator slot, in accordance with some examples.
Figure 1B:
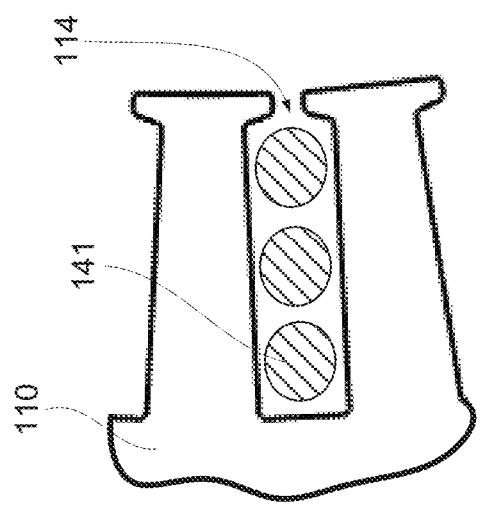
FIG. 1B is a schematic view of four coil elements, each having a rectangular cross section, protruding through the same stator slot, in accordance with some examples.

Convention electrical motors often use wires with a round cross-section to form coil windings. Round wires are easy to route and bend, resulting in their wide adoptions for different types of electrical motors. However, round wires leave unfilled space in stator slots between the wires (e.g., unfilled corners) even when the stator slot is tightly packed with the round wires as, for example, is shown in FIG. 1A. Specifically, FIG. 1A is a schematic view of conventional coil elements 141, each having a circular cross-section, protruding through the same slot 114 of stator core 110. One can easily see much of the unfilled space in slot 114. The insulation of coil elements 141 is not shown for clarity. As a result, the SFR value for round wires is typically less than 50%. Rectangular conductors yield much high SFR values (e.g., greater than 50%, greater than 60%, or even greater than 70%) as, for example, is shown in FIG. 1B. Specifically, FIG. 1B is a schematic view of coil elements 140, each having a rectangular cross-section, protruding through the same slot 114 of stator core 110. While rectangular coil elements provide a much higher SFR, these coil elements are more difficult to route due to their limited bendability, at least in some directions.

The routing difficulty often results in larger winding extensions at each side of the stator, increasing the overall size of the motor. For example, a coil may be formed by individual coil elements inserted into stator slots. The coil elements are bent on each side of the stator core to interconnect with each other and/or with busbars. These two portions of the stator winding, one at each side of the stator core, may be referred to as coil crowns. All bends of the coil elements and connections among the coil elements are provided with these coil crowns. The heights of these crowns and, in some examples, the external diameters of these crowns are typically greater for rectangular conductors than for round wires due to the limited bendability of the rectangular conductors. Furthermore, using individual coil elements, as oppose to a continuous wire, requires a large number of connections among the coil elements, adding to the complexity and the side of the crowns.

It should be noted that the routing and connections among the coil elements depend on the motor type. The routing and connections are typically much more complicated for fractional slot electric motors than, for example, for integer slot electric motors. However, fractional slot electric motors provide various advantages over integer slot electric motors, such as reduced cogging torque.

Figure 1C:
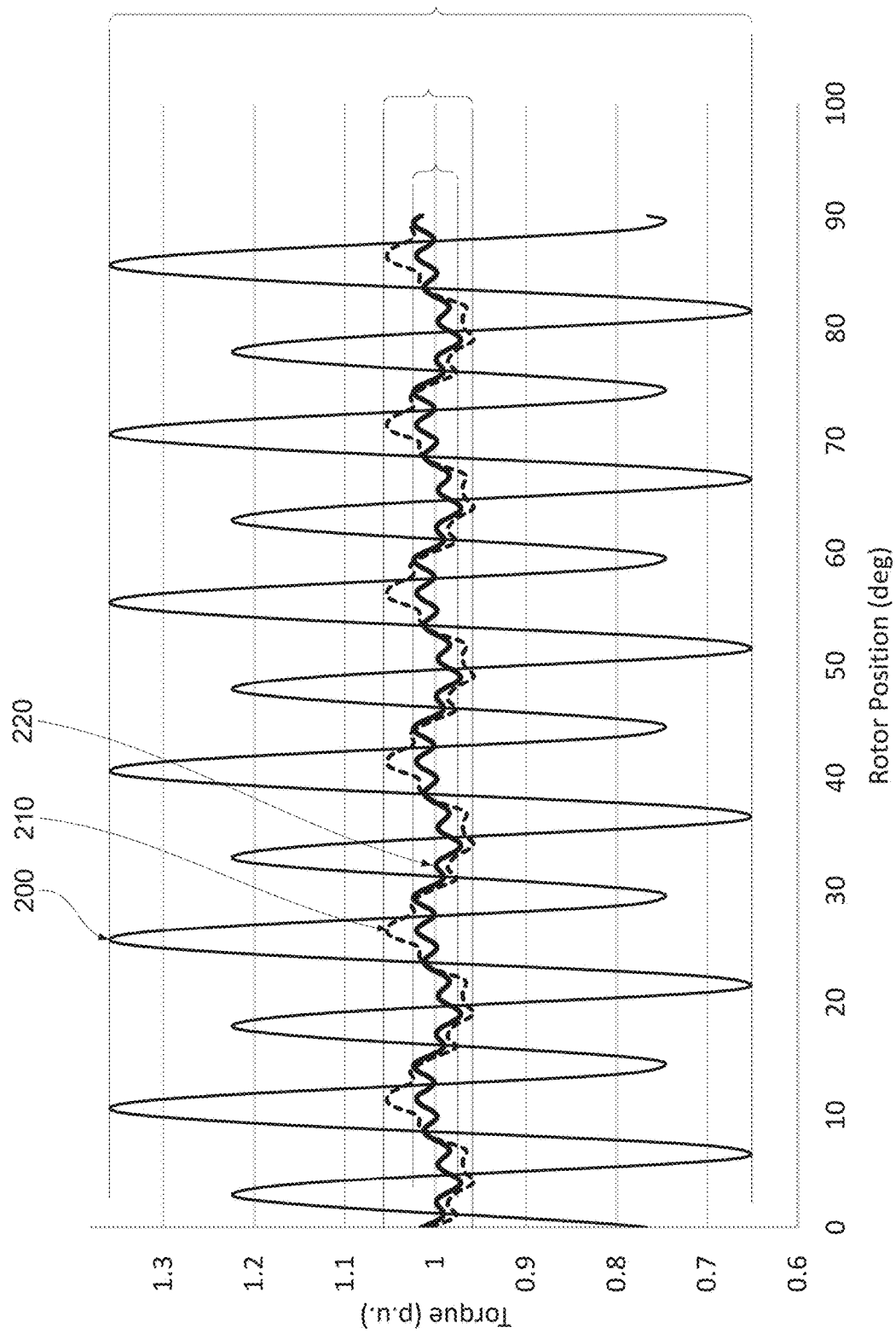
FIG. 1C illustrates cogging torque plots for different designs of electrical motors, including a 48-slot integer slot motor and two different designs of 60-slot fractional slot motors.

Cogging torque is a phenomenon in which the magnetic poles of the rotor align with magnetic features on the stator. During operation, the alignment of the magnetic poles and the magnetic features can result in an oscillatory torque, also known as cogging torque. In some cases, the cogging torque is large enough such that it is transmitted through structures supporting the motor and can be felt by end-users (e.g., drivers and passengers of electrical vehicles). Using a fractional slot per pole winding reduces cogging torque as, for example, is schematically shown in FIG. 1C. Specifically, FIG. 1C illustrates cogging torque plots for three different electrical motors, including a 48-slot integer slot motor (line 200) and two different designs of 60-slot fractional slot motors (line 210 and line 220). Specifically, line 220 corresponds to an example of a fractional slot motor described below. The torque values are obtained using a finite element analysis and have been normalized for simplicity. The cogging torque of the 48-slot integer slot motor is reduced by approximately a factor of 2 or more in both 60-slot fractional slot motors. Furthermore, different winding configurations of 60-slot fractional slot motors result in different cogging torque performance. This reduction in cogging torque results in reduced noise, vibration, and harshness (NVH). However, as noted above, the coil routing of fractional slot electric motors are quite complicated. The winding complexity presents various challenges in maintaining compact mechanical packaging of the wire connections, especially with rectangular coil elements.

Described herein are fractional slot electric motors, which use coil elements with a rectangular cross-sectional profile. These coil elements include looped coil elements and extended coil elements. Each looped coil element has two extensions protruding from a stator core and extending from the core at the first end of the core. Each looped coil element also has a loop end, interconnecting the two extensions at the second end of the core, opposite the first end. Each extended coil element has one end protruding from the stator core at the first end and another end protruding at the second end, opposite of the first end. The coil elements are interconnected directly with each other at the first end of the stator core. For example, the coil elements form two rows of interconnected pairs. Each pair is formed by one coil element, bent in a clockwise direction, and another coil element bent in a counterclockwise direction. The adjacent pairs are radially offset relative to each other. More specifically, each looped coil element is connected to two other coil elements at the first end. Each extended coil element is connected to one other coil element at the first end.

Furthermore, each extended coil element is connected to a lead assembly or another coil element at the second end of the stator core. The lead assembly comprises a combination of three phase busbars and two neutral busbars. The looped coil elements are not connected to any components at the second end. Instead, the end loops of the looped coil elements are positioned between the second end and the lead assembly. This configuration of the coil elements and the lead assembly allows complex connections between coil elements, needed for fractional slot motors while maintaining compact packaging on each side of the stator core. For example, the crown height at the first end may be less than 50 millimeters or even less than 45 millimeters, such as about 40 millimeters. The crown height at the second end, not accounting the lead assembly, may be less than 45 millimeters or even less than 40 millimeters, such as about 36 millimeters. The crown height at the second end, accounting for the lead assembly, may be less than 80 millimeters or even less than 70 millimeters, such as about 61 millimeters.

Fractional Slot Electric Motor Examples

Figure 2A:
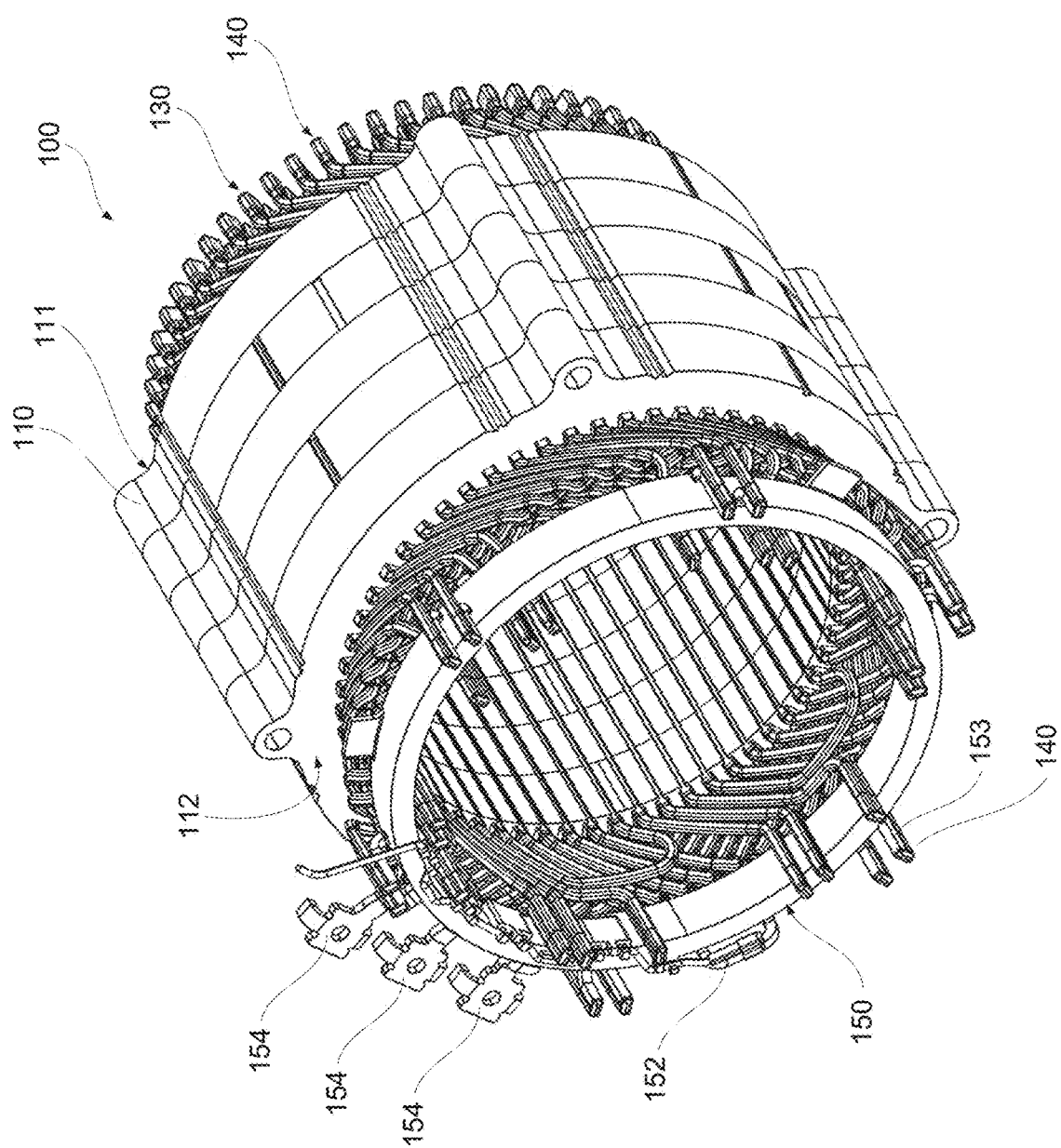
FIG. 2A is a perspective view of a fractional slot electric motor, shown without a rotor, in accordance with some examples.

FIG. 2A illustrates a perspective schematic view of fractional slot electric motor 100, in accordance with some examples. Fractional slot electric motor 100 is shown without a rotor to better illustrate other components of the motor. As shown in FIG. 2A, fractional slot electric motor 100 comprises stator core 110, coil 130, and lead assembly 150. Coil 130 is formed by coil elements 140, each protruding through stator core 110 and insulated from each other with a varnish coating (e.g., polyester varnish, epoxy varnish). The thickness of this insulation may be less than 300 micrometers or, more specifically, less than 250 micrometers, such as about 200 micrometers. Even with the insulating varnish, coil 130 provides some space between coil elements 140, e.g., for cooling or, more specifically, for circulating a cooling fluid among coil elements 140. In some examples, the average space between adjacent coil elements is between 0.5 millimeters and 2 millimeters or, more specifically, between 0.75 millimeters and 1.25 millimeters, such as about 1 millimeter. In some examples, stator core 110 is formed from multiple ferromagnetic annular plates arranged as a stack.

Coil elements 140 are directly interconnected with each other (e.g., by welding), primarily at first side 111 of stator core 110. However, a selected few coils are also directly interconnected with each other (e.g., by welding) at second side 112 of stator core 110. Furthermore, some of coil elements 140 are also connected to lead assembly 150 (e.g., also by welding).

In some examples, coil 130 has a 3 phase 2 parallel winding configuration. For the voltage to be balanced across the parallel legs, which are referred to as Parallel 1 and Parallel 2, various examples of coil elements 140 are used to form the two parallel windings with a balanced impedance. In some examples, this balanced impedance is achieved by a specific coil configuration, in which each parallel leg contains coils in both layers of the winding, More specifically, each winding has coils in every slot possible for their respective phase groups as shown and further described below with reference to FIGS. 8A-8F and FIG. 9. Without this balanced winding, the current distribution between the parallel legs may be uneven and will result in different heating rates for the different parallel windings. The reduction in cogging torque was observed through the electromagnetic finite element analysis presented above with reference to FIG. 1C.

Figures 2B, 2C:
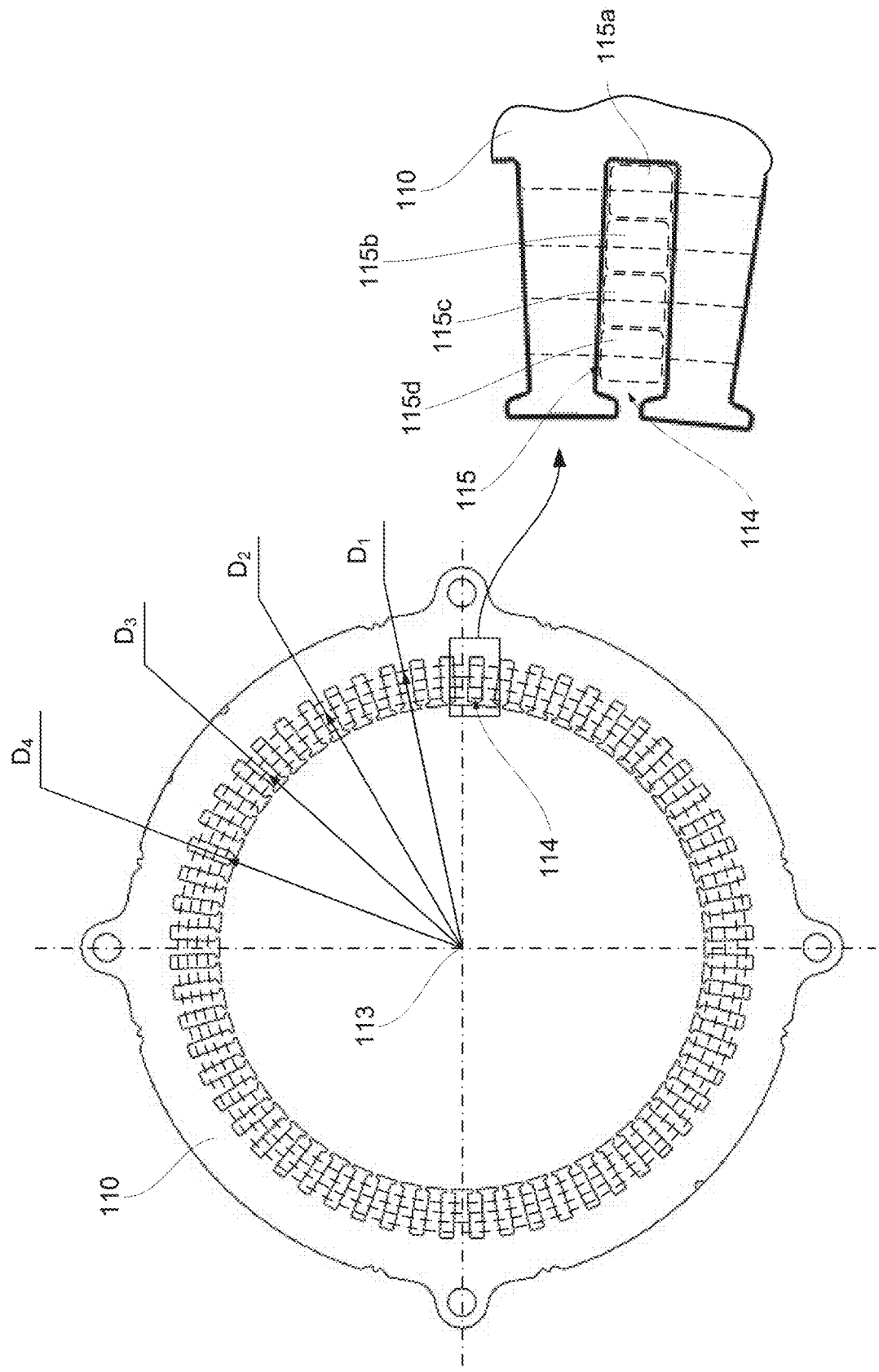
FIG. 2B is a top view of a stator core of the fractional slot electric motor in FIG. 2A, in accordance with some examples.
FIG. 2C is an expanded view of a stator slot, illustrating different positions for coil elements in the stator slot, in accordance with some examples.

Referring to FIG. 2B, stator core 110 comprises stator slots 114, extending between first side 111 and second side 112. In some examples, stator core 110 comprises 60 stator slots. Stator slots 114 are used to protrude coil elements 140 through stator core 110. In some examples, each stator slot is configured to receive four coil elements 140. The position of each coil element in the stator slot may be identified with a distance from center axis 113 of stator core 110. For example, FIG. 2B illustrates four concentric circles having diameters $D_1$, $D_2$, $D_3$, and $D_4$, each corresponding to a different coil position in each slot. FIG. 2C is an expanded view of one stator slot 114, identifying each position. The outermost (from center axis 113) position is identified as first position 115a and may be referred to as an "A" position. This position corresponds to the largest circle ($D_1$). Second position 115b, which may be referred to as a "B" position, corresponds to a slightly smaller circle ($D_2$). Third position 115c, which may be referred to as a "C" position, corresponds to an even smaller circle ($D_3$). Finally, the innermost position or fourth position 115d, which may also be referred to as a "D" position, corresponds to the smallest circle ($D_4$). As such, each of 240 different positions (60 stator slots×4 positions in each slot) may be identified by the slot number and the specific position in each slot. This identification is used, for example, in FIG. 9, described below. Overall, each coil element may protrude through one of 240 positions. Some types of coil elements (e.g., looped coil elements) protrude through two of 240 positions, which is further described below.

Referring back to FIG. 2A, each of coil elements 140 protrudes through one or two of the stator slots 114 between first side 111 and second side 112 of stator core 110. In some examples, coil elements 140 are made from copper or a copper alloy. An electrical current passing through these coil elements 140 generates electromagnetic flux, which can be modulated to control the speed of fractional slot electric motor 100.

As noted above, each coil element occupies one or two positions in stator slots 114. With 240 different positions, the number of coil elements 140 is at least 120. In some examples, this number is 144. In other words, coil 130 is formed by 144 individual coil elements 140, which are interconnected in accordance with the specific design of fractional slot electric motor 100, described below with reference to FIGS. 8A-8F and FIG. 9.

Figures 2D, 2E, 2F:
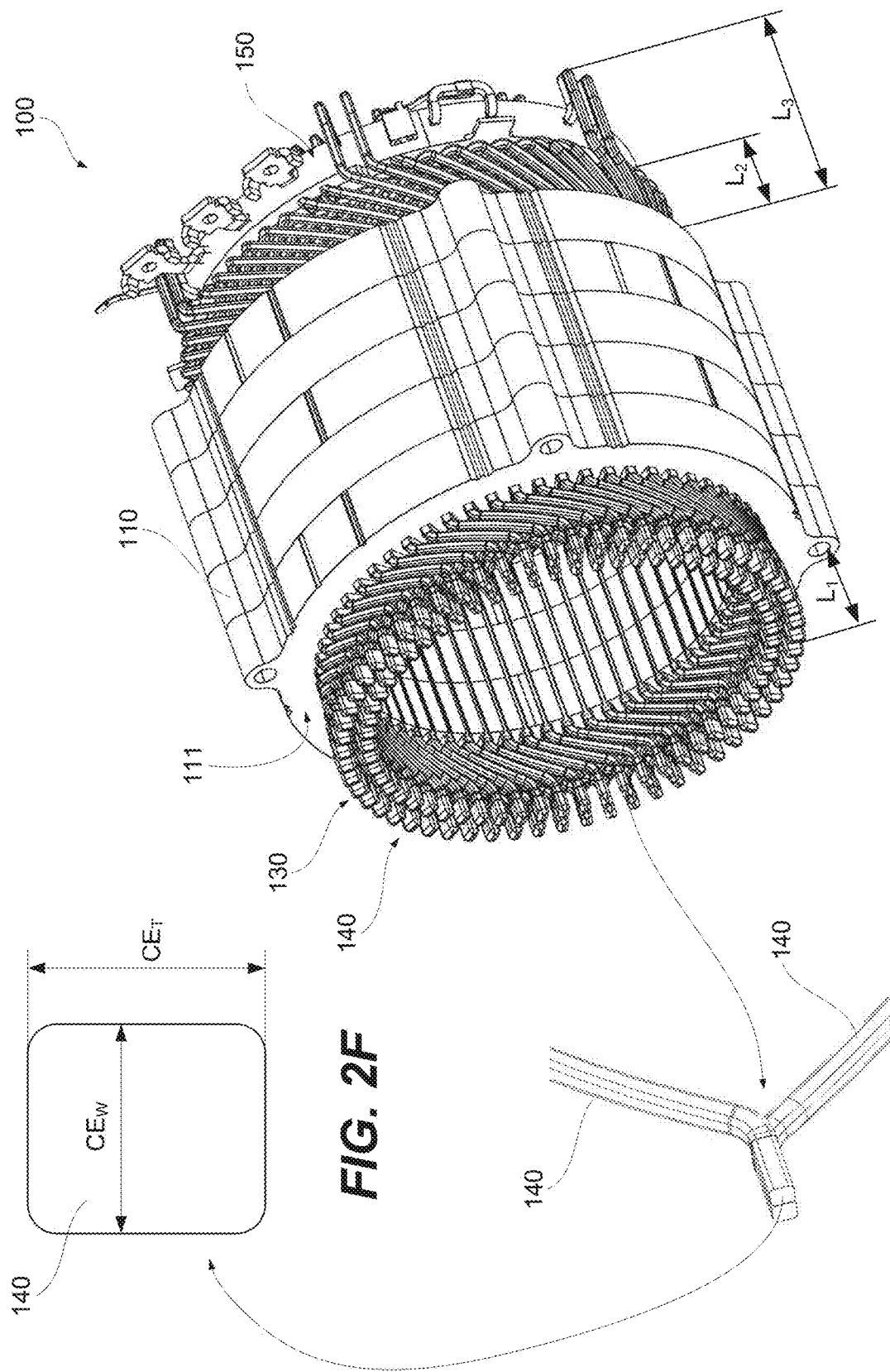
FIG. 2D is another perspective view of the fractional slot electric motor in FIG. 2A, illustrating electrical connections of coil elements at a first side of the stator core, opposite to the lead assembly, in accordance with some examples.
FIG. 2E is an expanded view of two coil elements connected at the first side of the stator core, in accordance with some examples.
FIG. 2F is a cross-sectional profile of a coil element, in accordance with some examples.

Referring to FIG. 2D, coil elements 140 are interconnected at first side 111 of stator core 110. More specifically, each of coil elements 140 is electrically coupled to at least one other of coil elements 140 adjacent to first side 111 of stator core 110 as, e.g., is shown in FIG. 2E. Some examples of coil elements 140 (e.g., looped coil elements) are each coupled to two other coil elements, as further described below with reference to FIG. 6A-FIG. 6C. These connections are formed, e.g., by welding or, more specifically, by laser welding.

Referring to FIG. 2F, each of coil elements 140 has a rectangular cross-sectional profile. The rectangular cross-sectional profile allows increasing the SFR, as was described above with reference to FIG. 1A and FIG. 1B. In some examples, each coil element 140 has a thickness ($CE_T$) of between 3.0 millimeters and 4.0 millimeters, such as about 3.4 millimeters, and a width ($CE_W$) of between 2.5 millimeters and 3.5 millimeters, such as about 3.0 millimeters. However, other examples are within the scope.

Figure 3A:
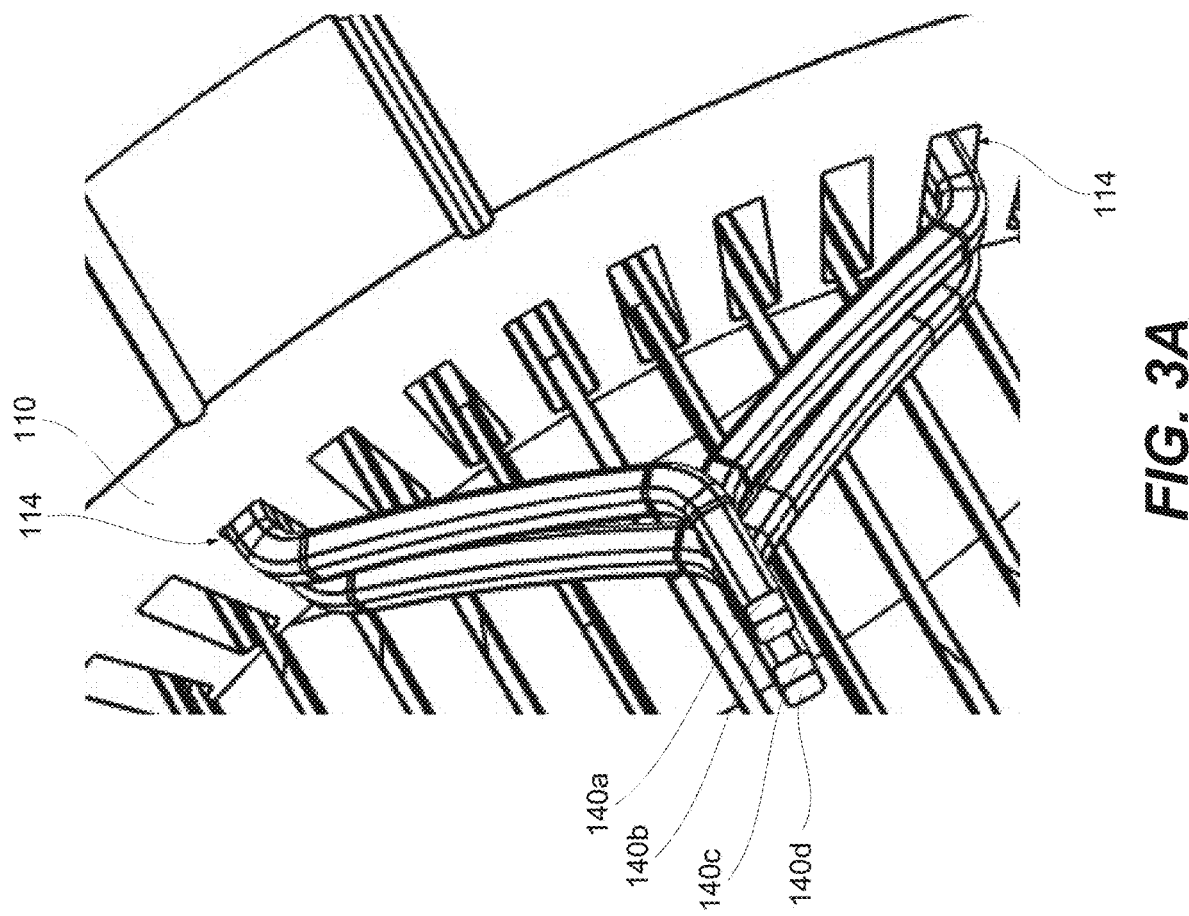
FIG. 3A is a perspective view of two pairs of coil elements, extending from the stator core at the first side, illustrating electrical connections in each pair, in accordance with some examples.

During assembly of fractional slot electric motor 100, coil elements 140 are inserted into stator slots 114 from second side 112 of stator core 110. At this stage, portions of coil elements 140, protruding through stator slots 114 and extending from first side 111 of stator core 110 are straight. After that, the connections are formed between these ends of coil elements 140 (e extending from first side 111) by bending these ends, which will now be described with reference to FIG. 3A, FIG. 3B, and FIG. 3C. Specifically, FIG. 3A illustrates four coil elements 140 extending from two stator slots 114 and forming electrical connections at first side 111 of stator core 110. Other coil elements are not shown in FIG. 3A for clarity. These stator slots 114 are separated by six other stator slots, effectively representing first and eight stator slots 114. Each of coil elements 140 is bent to form electrical connections with a corresponding coil element.

Figure 3C:
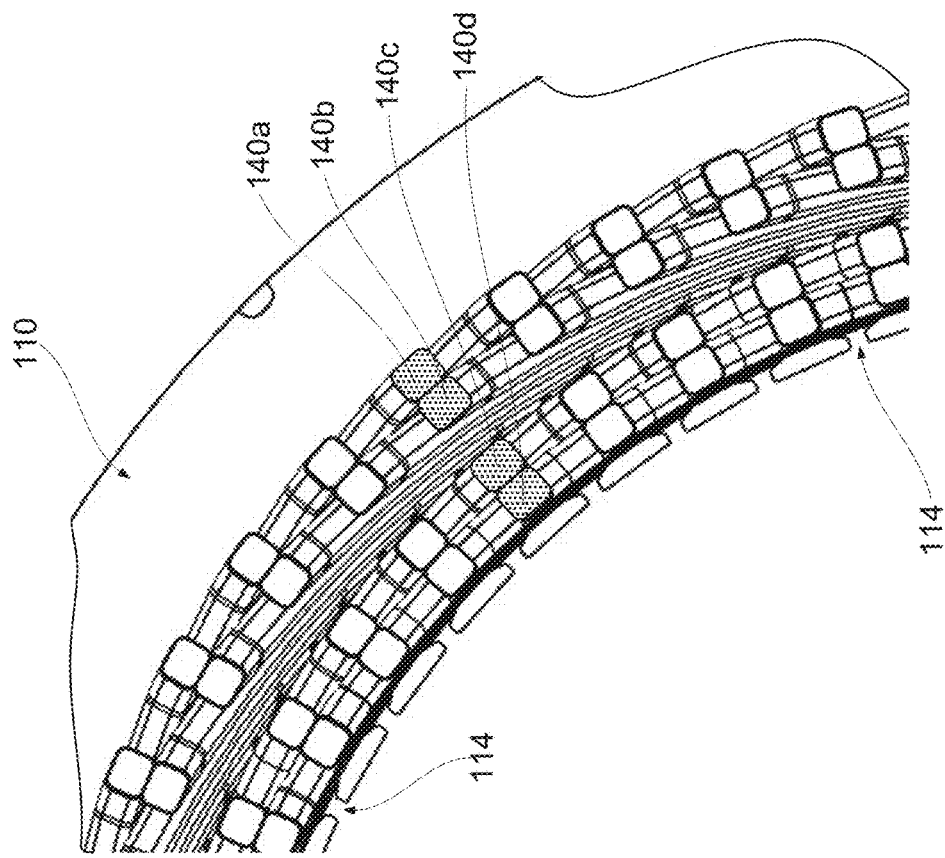
FIG. 3C is a top view of the two pairs of coil elements in FIG. 3A and FIG. 3B, with all other coil elements shown, in accordance with some examples.
Figure 3B:
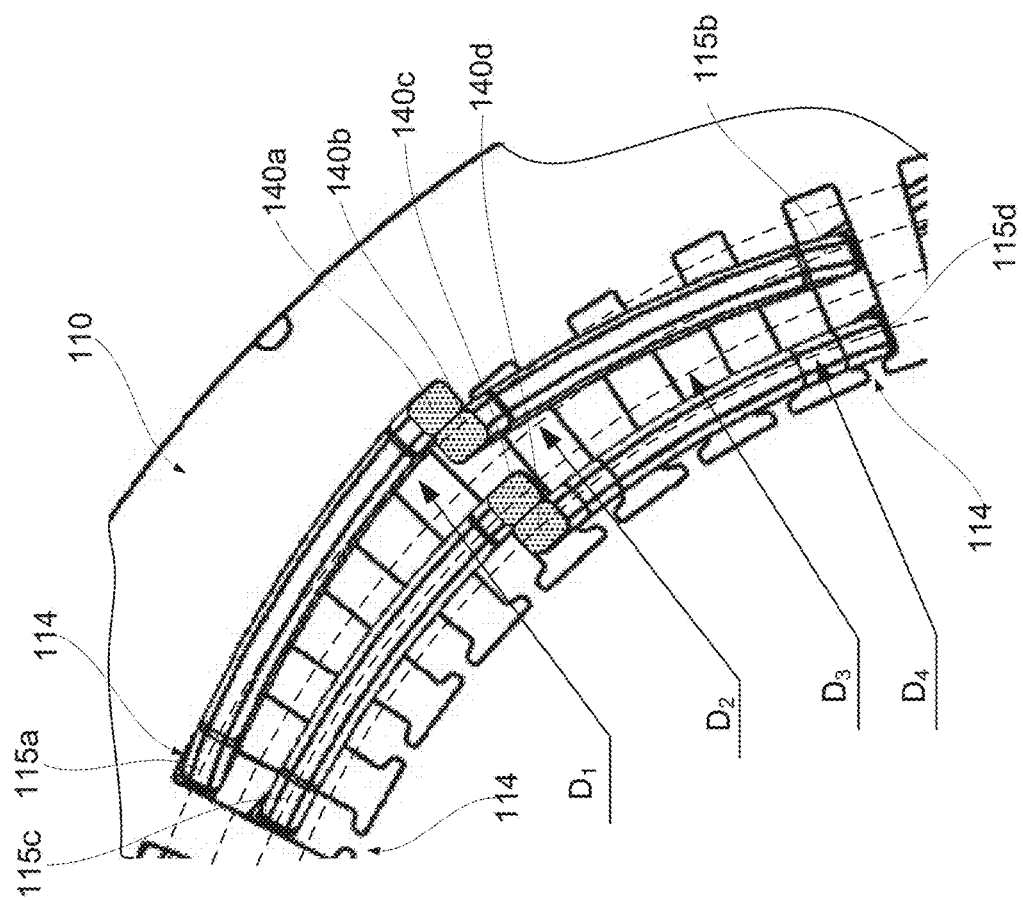
FIG. 3B is a top view of the two pairs of coil elements in FIG. 3A, with other coil elements not shown, in accordance with some examples.

FIG. 3B is a top view corresponding to FIG. 3A illustrating the degree of circumferential and radial bends of each coil element. FIG. 3B also illustrates four arcs ($D_1$, $D_2$, $D_3$, and $D_4$) corresponding to different positions in each slot, which are described above with reference to FIG. 2B and FIG. 2C. Around the stator circumference, each coil element is bent the distance corresponding to 3.5 slot spaces, with 1 slot space corresponding to an arc length between the centers of two adjacent slots. It should be noted that that the arc length corresponding to $D_4$ is longer than the arc length corresponding to $D_1$. However, the bending direction is different or, more specifically, opposite for the two interconnected coil elements. For example, first coil element 140a is bent clockwise, while second coil element 140b is bent counterclockwise. First coil element 140a and second coil element 140b are interconnected above the portion of stator core 110, located between the third and fourth stator slots. Similarly, third coil element 140c is bent clockwise, while fourth coil element 140d is bent counterclockwise. Third coil element 140c and fourth coil element 140d are also interconnected above the same portion of stator core 110.

However, first coil element 140a and second coil element 140b are also bent radially away from the stator core center axis to provide some space from third coil element 140c. For example, second coil element 140b extends from stator slot 114 at second position 115b ("B" position, corresponding to $D_2$), However, the end of second coil element 140b, which forms an electrical connection with first coil element 140a, is positioned over the arc, corresponding to the first position ("A" position) and having a diameter of $D_1$. Similarly, first coil element 140a extends from stator slot 114 at first position 115a ("A" position, corresponding to $D_1$). The end of first coil element 140a, which forms an electrical connection with second coil element 140b, radially extends outside of the designated positions. On the other hand, third coil element 140c extends from stator slot 114 at third position 115c ("C" position, corresponding to $D_3$) and forms an electrical connection with fourth coil element 140d at that position. Similarly, fourth coil element 140d extends from stator slot 114 at fourth position 115d ("D" position, corresponding to $D_4$) and forms an electrical connection with third coil element 140c at that position. In other words, first coil element 140a and second coil element 140b are both bent radially away from the stator axis by one position. In comparison, third coil element 140c and fourth coil element 140d are not bent radially.

FIG. 3C illustrates all remaining coil elements surrounding first coil element 140a, second coil element 140b, third coil element 140c, and fourth coil element 140d. It should be noted that the connection and bent features, described above with reference to first coil element 140a, second coil element 140b, third coil element 140c, and fourth coil element 140d, are repeated 60 times around the circumference of stator core 110. This configuration consistency allows greatly reducing the crown height, formed by interconnected coil elements 140, at first side 111 of stator core 110. Briefly referring to FIG. 2D, coil elements 140 extend ($L_1$) by less than 50 millimeters or even less than 45 millimeters at first side 111 of stator core 110. In some examples, this coil extension/crown height ($L_1$) is between 38 millimeters and 42 millimeters, such as about 40 millimeters.

Figure 4A:
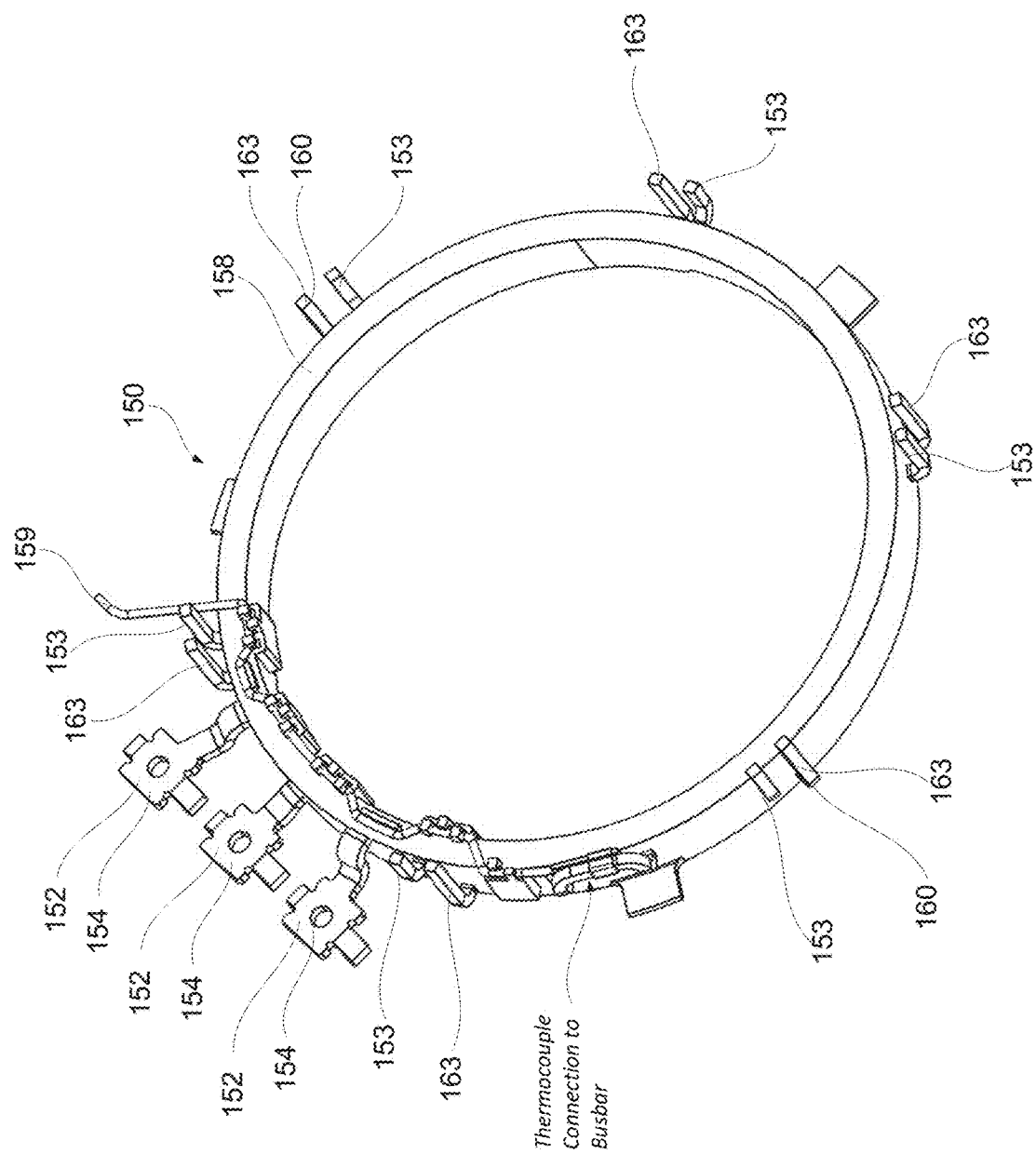
FIG. 4A is a perspective view of a lead assembly for connecting to coil elements at the second side of the stator core and forming external electrical connections to the fractional slot electric motor, in accordance with some examples.

Referring to FIG. 4A, lead assembly 150 comprises three phase busbars 152, each corresponding to a different phase of fractional slot electric motor 100. Three phase busbars 152 provide external connections to fractional slot electric motor 100 and are also connected to some of coil elements 140. In some examples, lead assembly 150 comprises two neutral busbars 160, used for interconnecting other coil elements 140. Unlike phase busbars 152, two neutral busbars 160 do not form external connections.

Phase busbars 152 and neutral busbars 160 are insulated from each other and also supported with respect to each other by busbar insulator 158. In some examples, busbar insulator 158 molded over phase busbars 152 and neutral busbars 160. In other words, phase busbars 152 and neutral busbars 160 are integrated into busbar insulator 158. However, various connecting terminals extend from busbar insulator 158 to form connections to phase busbars 152 and neutral busbars 160.

FIG. 4A also illustrates busbar thermocouple 159, which is an optional component of lead assembly 150. When present, busbar thermocouple 159 is connected to one busbar 152, which extends from busbar insulator 158, and is configured to measure the temperature of this busbar 152. This temperature measurement is communicated to a motor controller, e.g., to reduce the current through fractional slot electric motor 100, when the temperature exceeds a certain threshold.

FIG. 4B illustrates lead assembly 150 without busbar insulator 158, to show the arrangement of phase busbars 152 and neutral busbars 160 in lead assembly 150. Phase busbars 152 form top layers of lead assembly 150. These layers are further away from stator core 110. Neutral busbars 160 form the bottom layer, closest to stator core 110.

FIG. 4C illustrates neutral busbars 160 without other components of lead assembly 150 shown for clarity. In this example, each neutral busbar 160 comprises three neutral terminals 163 and neutral hoop 165, interconnecting neutral terminals 163. Neutral terminals 163 are used to connect three coil different elements 140, interconnected by neutral busbar 160. As shown in FIG. 4C, neutral terminals 163 are radially offset from neutral hoop 165 to avoid interference with other components of lead assembly 150 and coil elements 140. Furthermore, referring to FIG. 4A, neutral terminals 163 extend through and away from busbar insulator 158, thereby allowing to form electrical connections to coil elements 140. Neutral hoop 165 remains enclosed within and insulated by busbar insulator 158.

Figure 4H:
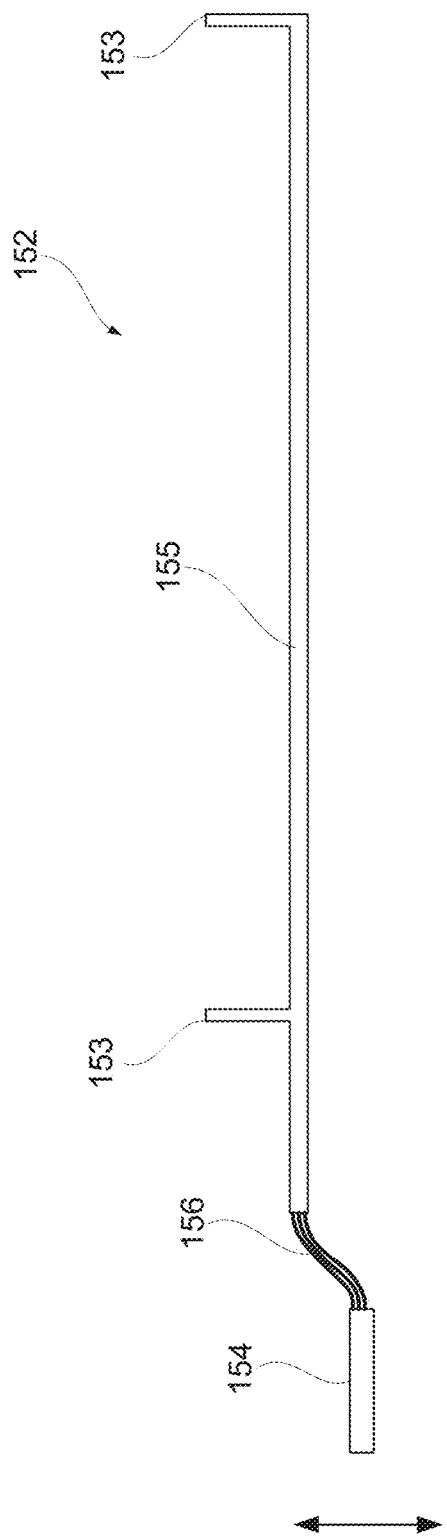
FIG. 4H is a schematic side view of any one of the phase busbars in FIG. 4D, illustrating the flexible connection between a primary connection terminal and a hoop, in accordance with some examples.

FIG. 4D illustrates phase busbars 152 without other components of lead assembly 150 shown. FIGS. 4E-4G provide separate illustrations of each of these three phase busbars 152. Each busbar 152 comprises two phase terminals 153 to form connections to two coil elements 140. Two phase terminals 153 of each phase busbar 152 are joined or connected by hoop 155, which may have a planar semi-circular shape. Furthermore, unlike neutral busbars 160, each phase busbar 152 comprises external terminal 154 for connecting fractional slot electric motor 100 to an external power source (e.g., an inverter). External terminal 154 is connected to hoop 155 by neck 156. In some examples, neck 156 provides a flexible connection between external terminal 154 and hoop 155 such that primary connection terminal 154 is able to move at least in the direction perpendicular to the plane of hoop 155 as, for example, is schematically shown in FIG. 4H. For example, neck 156 and, in some examples, external terminal 154 is formed from a stack of thin metal strips. This flexibility preserves internal connections (e.g., between phase terminals 153 and coil elements 140) and/or external connections (e.g., between external terminals 154 and the external power source).

Figures 5A, 5B:
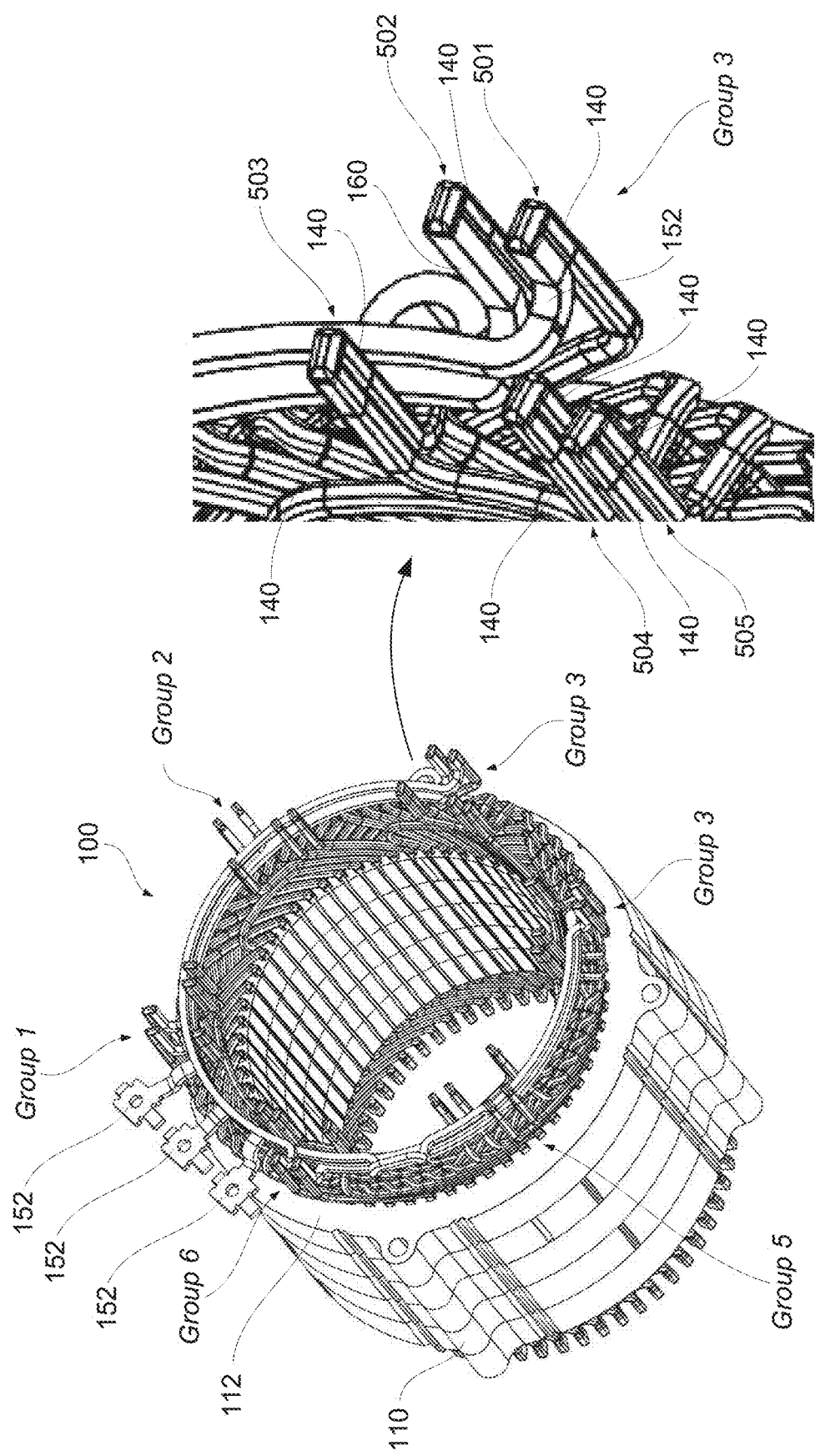
FIG. 5A is a perspective view of the fractional slot electric motor without a busbar insulator, illustrating electrical connections between coil elements, phase busbars, and neutral busbars, in accordance with some examples.
FIG. 5B is an expanded perspective view of a portion of the fractional slot electric motor in FIG. 5A, showing electrical connections in one group, in accordance with some examples.

Various connections between lead assembly 150 and coil elements 140 will now be described with reference to FIG. 5A and FIG. 5B. Specifically, FIG. 5A illustrates fractional slot electric motor 100 without busbar insulator 158, showing various connections at second side 112 of stator core 110. These connections may be conceptually divided into six groups, identified as Group 1-Group 6 in FIG. 5A. The same types of connections exist in each group, which are further illustrated in FIG. 5B for Group 3. Specifically, FIG. 5B shows five different connections 501-502 between lead assembly 150 and coil elements 140 or just between coil elements 140. Connection 501 is between phase busbar 152 and coil element 140, while connection 502 between neutral busbar 160 and another coil element 140. Each of connection 503, connection 504, and connection 505 is between a pair of different coil elements 140.

It should be noted that in this example, only 30 connections are formed by coil elements 140 at second side 112 of stator core 110. 18 of the 30 connections are among coil elements 140, 6 connections between coil elements 140 and phase busbars 152. (2 connections to each phase busbar 152), and 6 connections between coil elements 140 and neutral busbars 160 (3 connections to each neutral busbar 160). These connections are specific types of coil elements 140, which are referred to as extended coil elements. Overall, 48 extended coil elements are used for these connections: two coil elements for each of 18 element-element connections (or a total of 36 coil elements), 6 coil elements for element-neutral busbar connections, and 6 coil elements for element-phase busbar connections. The remaining coil elements 140 do not form any connections at second side 112 of stator core 110. Instead, these coil elements 140 protrude from one stator slot 114 and extend toward and into another stator slot 114. These coil elements 140 are referred to as looped coil elements. In this example, there are 96 looped coil elements. Both types of coil elements will now be explained with reference to FIG. 6A-FIG. 6E.

FIG. 6A illustrates fractional slot electric motor 100 without lead assembly 150, showing the arrangement of coil elements 140 at second side 112 of stator core 110. FIGS. 6B-6E illustrates individual coil elements 140. More specifically, FIGS. 6B-6D illustrate three examples of looped coil elements 141. FIG. 6E illustrates an example of extended coil elements 142.

Referring to FIG. 6B-6D, each looped coil element 141 comprises two loop extensions 143, each terminating with loop extension end 145. Loop extensions 143 are interconnected by end loop 144. Loop extensions 143 protrude through stator core 110 between first side 111 and second side 112, through different stator slots 114. Loop extension ends 145 extend from stator core 110 at first side 111 and are connected to ends of other coil elements 140 as described above with reference to FIG. 2D. End loop 144 extends from stator core 110 at second side 112 and between different stator slots 114. As noted above, looped coil element 141 is not connected to any other elements at second side 112.

Referring to FIG. 6E, each extended coil element 142 comprises one extension 146, terminating with first extension end 147 and second extension end 148. Extension 146 protrudes through stator core 110. First extension ends 147 extends from stator core 110 at first side 111 and is connected to first extension end 147 of another extended coil element 142 or loop extension 143 of looped coil element 141. Second extension end 148 extends from stator core 110 at second side 112 and is connected second extension end 148 of another extended coil elements 142, connected to busbar 152, or connected to neutral busbar 160.

FIG. 7A is a schematic illustration of first-type coil element 171, which is an example of looped coil elements 141. FIG. 7B is a top view corresponding to FIG. 7A. Specifically, FIG. 7B illustrates first-type coil element 171 protruding into first stator slot 114a (at the "D" position corresponding to $D_4$) and second stator slot 114b (also at the "D" position corresponding to $D_4$), Second stator slot 114b is separated by five other slots from first stator slot 114a. Furthermore, first-type coil element 171 extends over "D" positions, thereby having no substantial radial offset, at least at second side 112 of stator core 110. Finally, first-type coil element 171 extends circumferentially to end point 149, which is past second stator slot 114b, and then forms a return loop to second stator slot 114b. This feature is used to avoid interference from other coil elements, e.g., extending from other slots between first stator slot 114a and second stator slot 114b, First-type coil element 171 may be referred to as a "slot D—large span" coil element. In some examples, coil elements 140 comprise six different instances of first-type coil element 171.

Figure 7C:
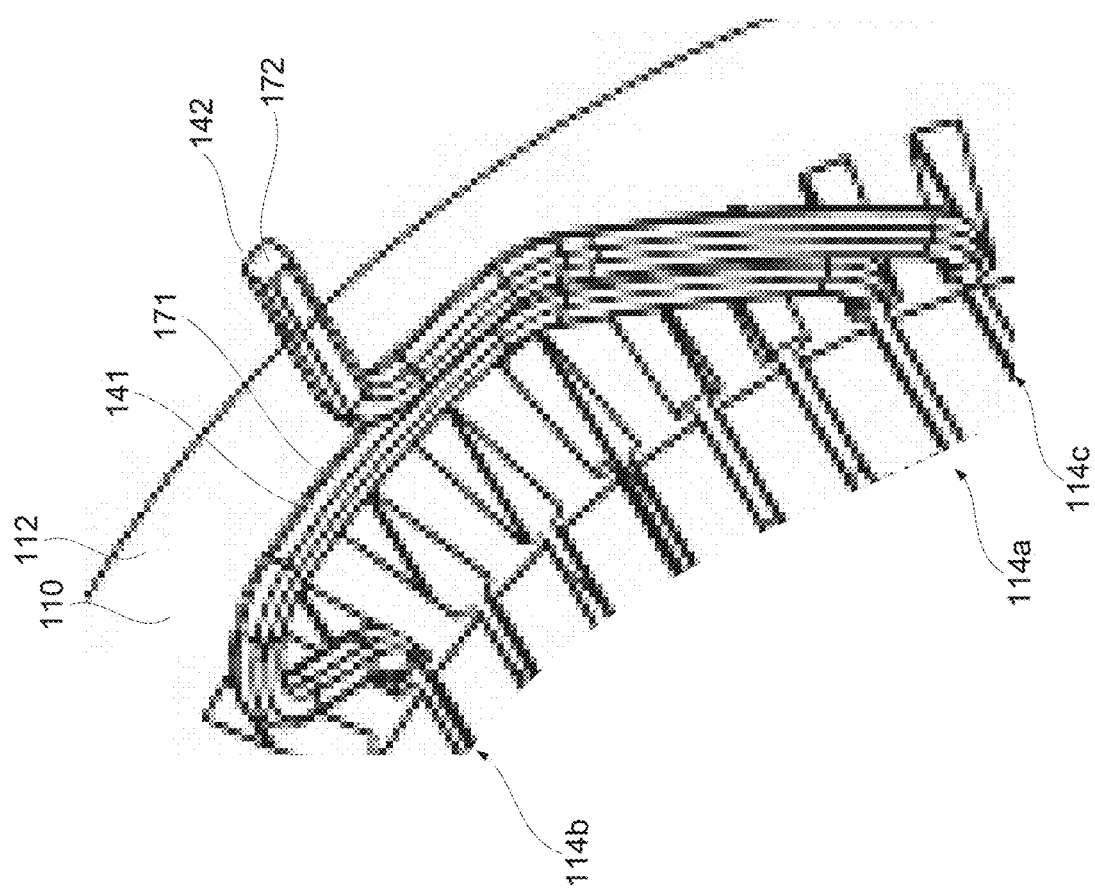
FIG. 7C is a perspective view of a portion of the stator core, showing the shape of two coil elements adjacent to each other, in accordance with some examples.

FIG. 7C is a schematic illustration of first-type coil element 171 together with second-type coil element 172. Second-type coil element 172 is an example of extended coil elements 142, Second-type coil element 172 extends from third stator slot 114c, adjacent to first stator slot 114a, and follows the shape of first-type coil element 171, before extending away from second side 112 of stator core 110. This extension is used to form an electrical connection to second-type coil element 172.

FIG. 7D is a schematic illustration of third-type coil element 173, which is another example of looped coil elements 141. FIG. 7E is a top view corresponding to FIG. 7D. Specifically, FIG. 7E illustrates third-type coil element 173 protruding into first stator slot 114a (at the "D" position corresponding to $D_4$) and second stator slot 114b (also at the "C" position corresponding to $D_3$). It should be noted that first stator slot 114a and second stator slot 114b in FIG. 7E may be different from those identified in other figures (e.g., FIG. 7B and FIG. 7C) and are used to describe a specific coil element example. In FIG. 7E, second stator slot 114b is separated by seven other slots from first stator slot 114a. Furthermore, third-type coil element 173 extends radially across all coil positions (from the "D" position to the "A" position) before returning back to the "C" position. This feature is used to avoid interference from other coil elements. Third-type coil element 173 may be referred to as a "slot C-D—crown span 8 slots" coil element. In some examples, coil elements 140 comprise 30 different instances of third-type coil element 173.

Figure 7G:
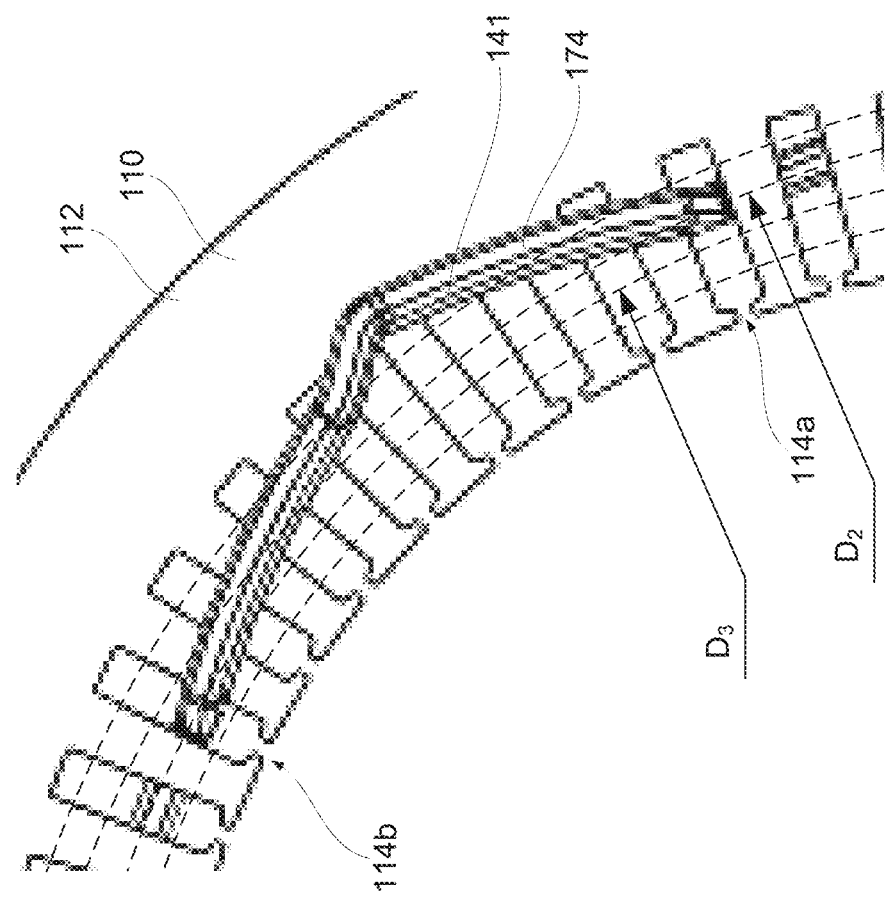
FIG. 7G is a top view of a portion of the stator core in FIG. 7F, showing the shape of the coil element, in accordance with some examples.
Figure 7F:
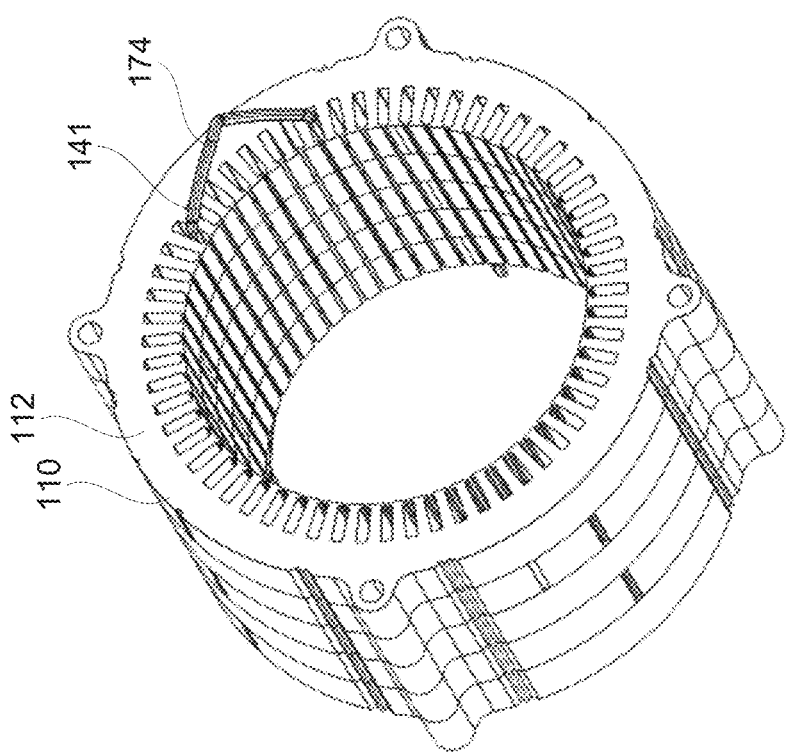
FIG. 7F is a perspective view of the stator core with yet another one of the coil elements inserted into the core, in accordance with some examples.

FIG. 7F is a schematic illustration of fourth-type coil element 174, which is another example of looped coil elements 141. FIG. 7G is a top view corresponding to FIG. 7F. Specifically, FIG. 7G illustrates fourth-type coil element 174 protruding into first stator slot 114a (at the "B" position corresponding to $D_2$) and second stator slot 114b (also at the "C" position corresponding to $D_3$). As before, first stator slot 114a and second stator slot 114b in FIG. 7F may be different from those identified in other figures. In FIG. 7G, second stator slot 114b is separated by six other slots from first stator slot 114a. Furthermore, fourth-type coil element 174 extends radially across all coil positions (from the "B" position past the "A" position) before returning back to the "C" position. This feature is used to avoid interference from other coil elements. Fourth-type coil element 174 may be referred to as a "slot B-C—crown span 7 slots" coil element. In some examples, coil elements 140 comprise 30 different instances of fourth-type coil element 174.

Figure 7I:
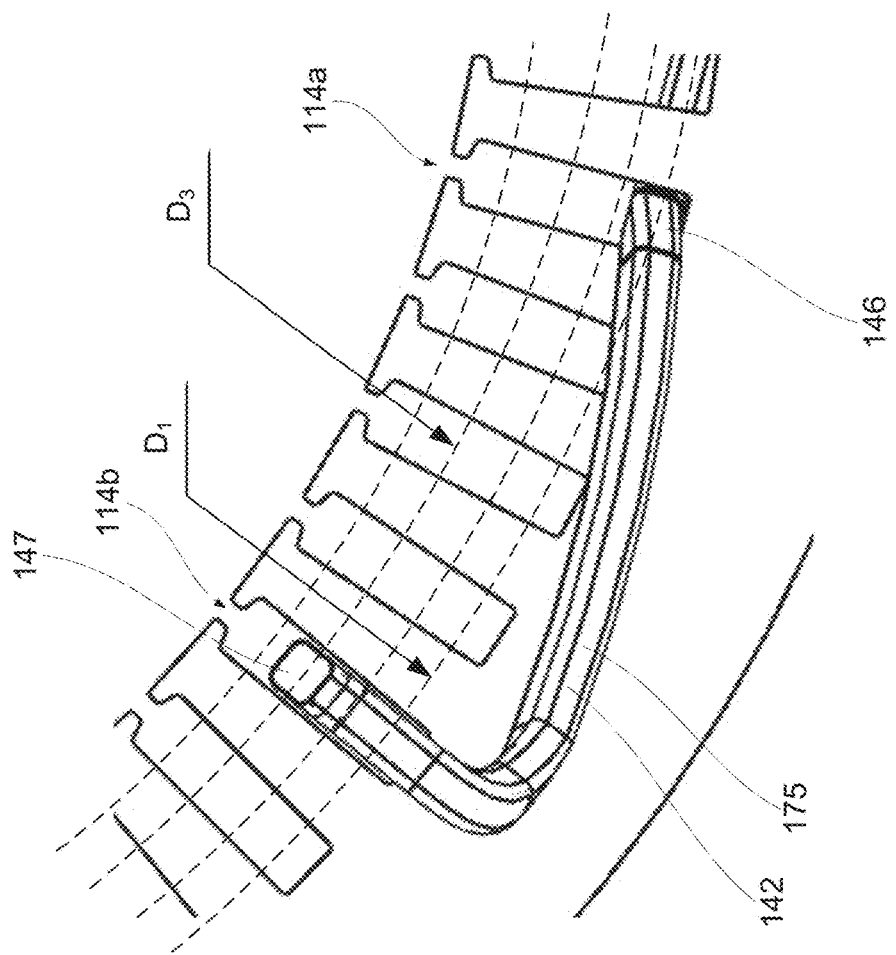
FIG. 7I is a top view of a portion of the stator core in FIG. 7H, showing the shape of the coil element, in accordance with some examples.
Figure 7H:
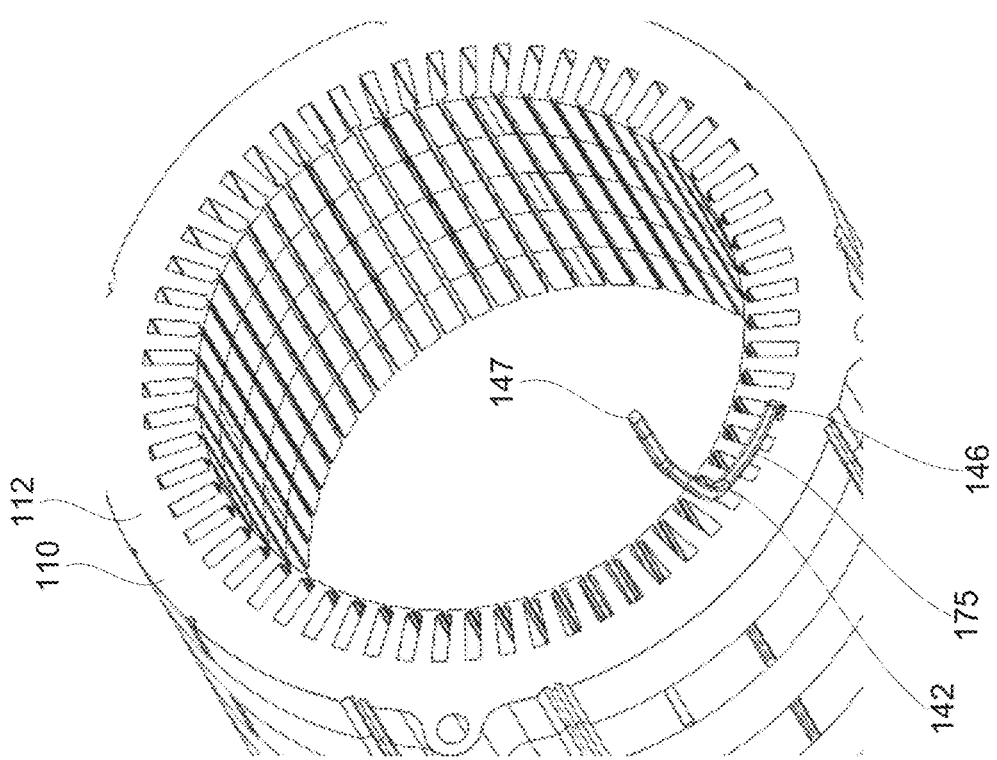
FIG. 7H is a perspective view of the stator core with another one of the coil elements inserted into the core, in accordance with some examples.

FIG. 7H is a schematic illustration of fifth-type coil element 175, which is an example of extended coil elements 142, FIG. 7I is a top view corresponding to FIG. 7H. Specifically, FIG. 7I illustrates fifth-type coil element 175, comprising extension 146, which protrudes into first stator slot 114a (at the "A" position corresponding to $D_1$), First end 147 of fifth-type coil element 175 extends from stator core 110 for connection another coil element or lead assembly 150. More specifically, first end 147 extends over second stator slot 114b, separated by three other slots from first stator slot 114a. Furthermore, first end 147 extends over the "C" position in second stator slot 114b. In some examples, first end 147 extends over the "D" position in second stator slot 114b. This feature is used to avoid interference from other coil elements. Fifth-type coil element 175 may be referred to as an "I pin slot D-A" an "I pin slot D-A." In some examples, coil elements 140 comprise 18 different instances of fifth-type coil element 174.

Overall, in some examples, fractional slot electric motor 100 comprises 144 separate coil elements 140. These coil elements 140 may be represented by 7 different types or configurations, five of which are described above with reference to FIG. 7A-7I. In some examples, coil elements 140 comprise 96 looped coil elements 141 and 48 extended coil elements 142.

Figure 8B:
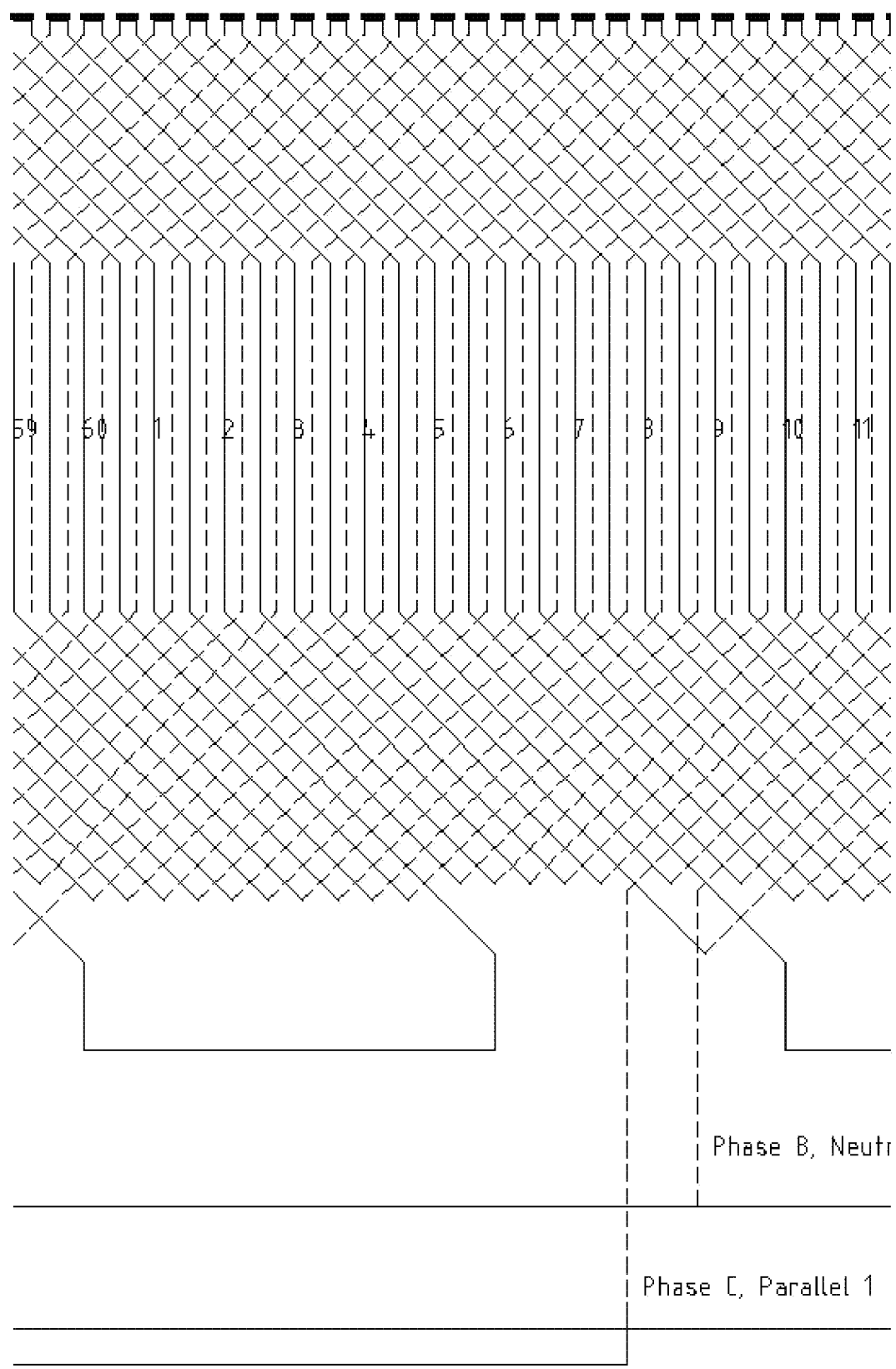
FIG. 8B, FIG. 8C, FIG. 8D, FIG. 8E, and FIG. 8F illustrate different portions of the stator wiring schematic in FIG. 8A, in accordance with some examples.
Figure 8C:
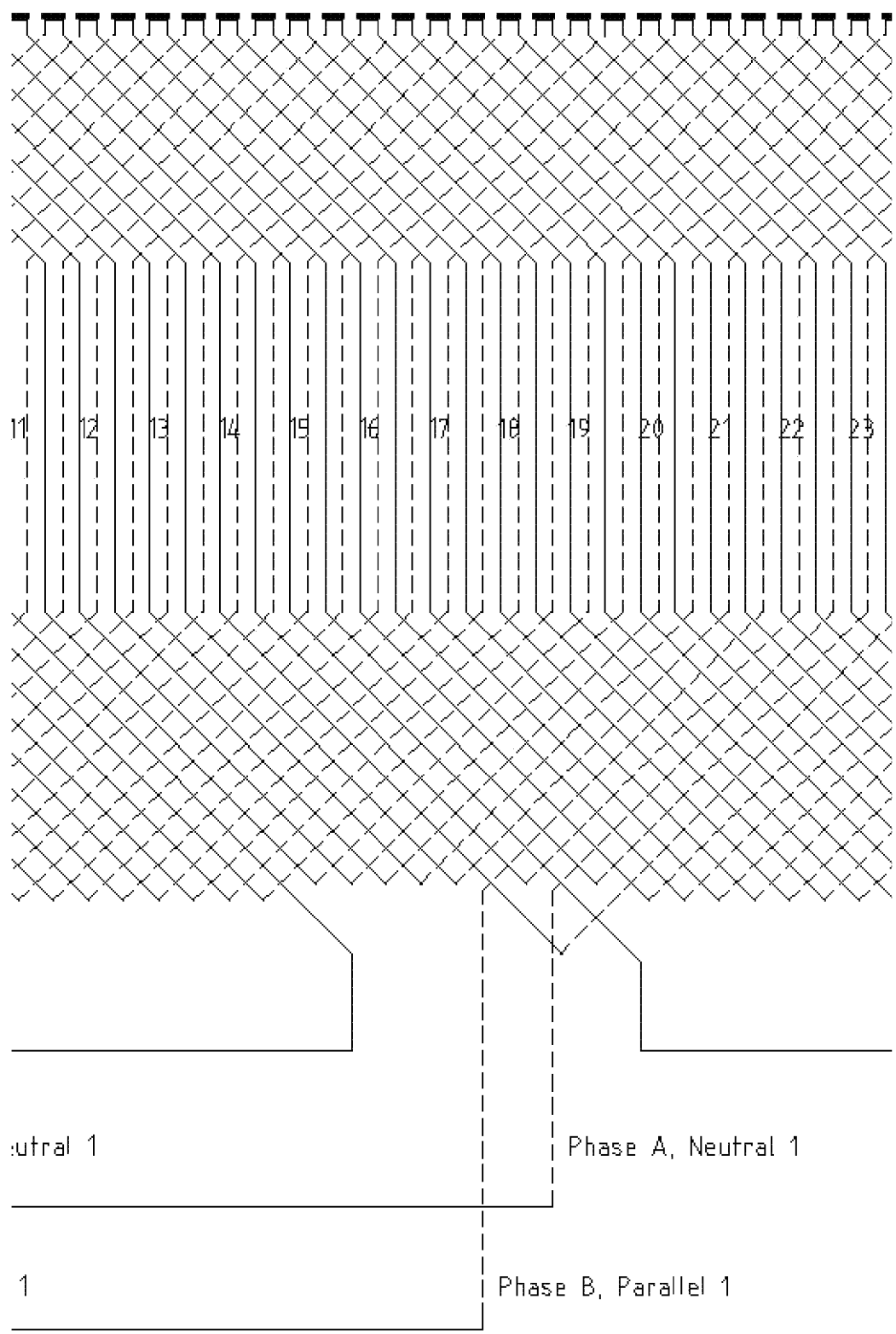
Figure 8D:
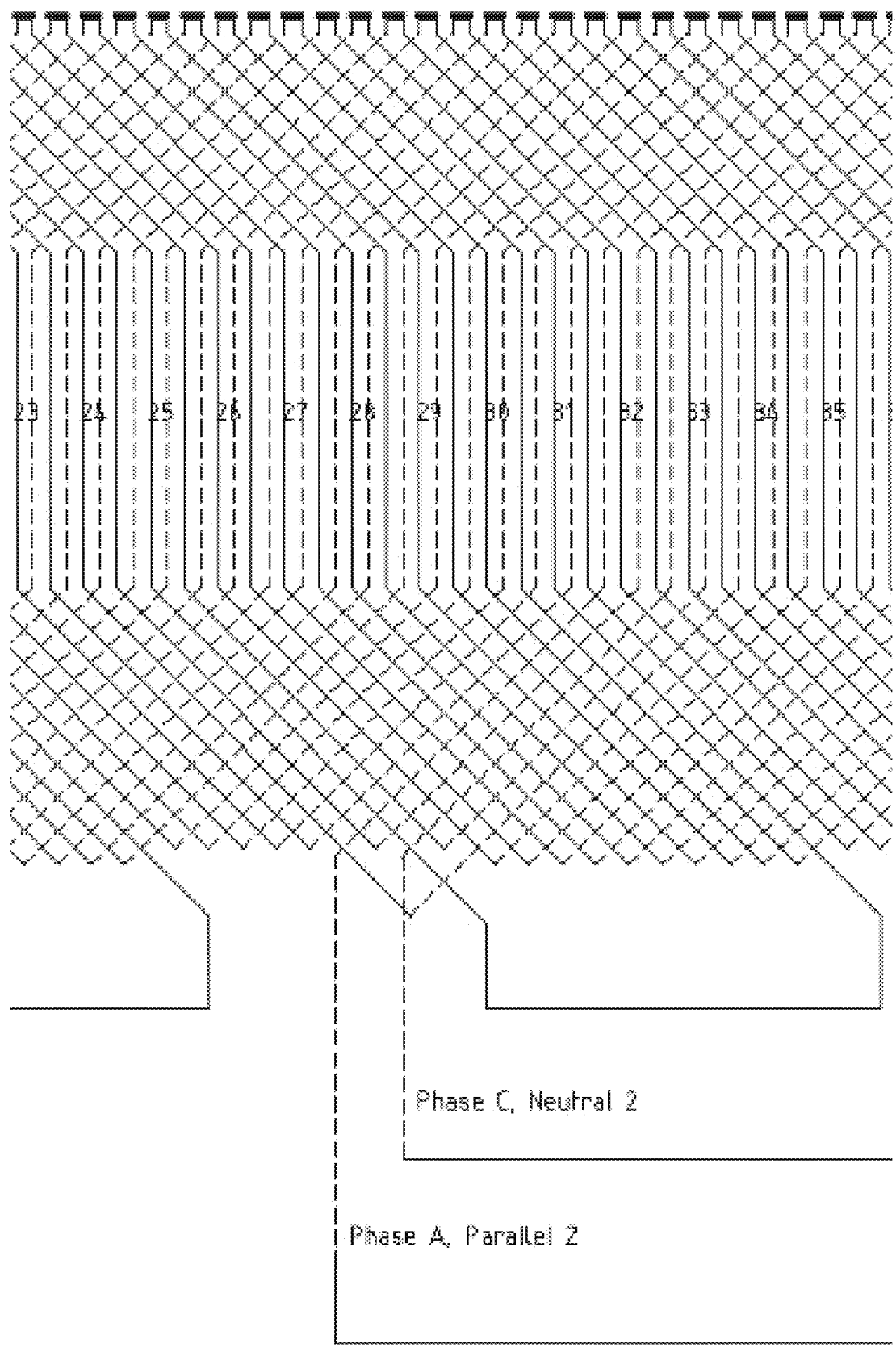
Figure 8E:
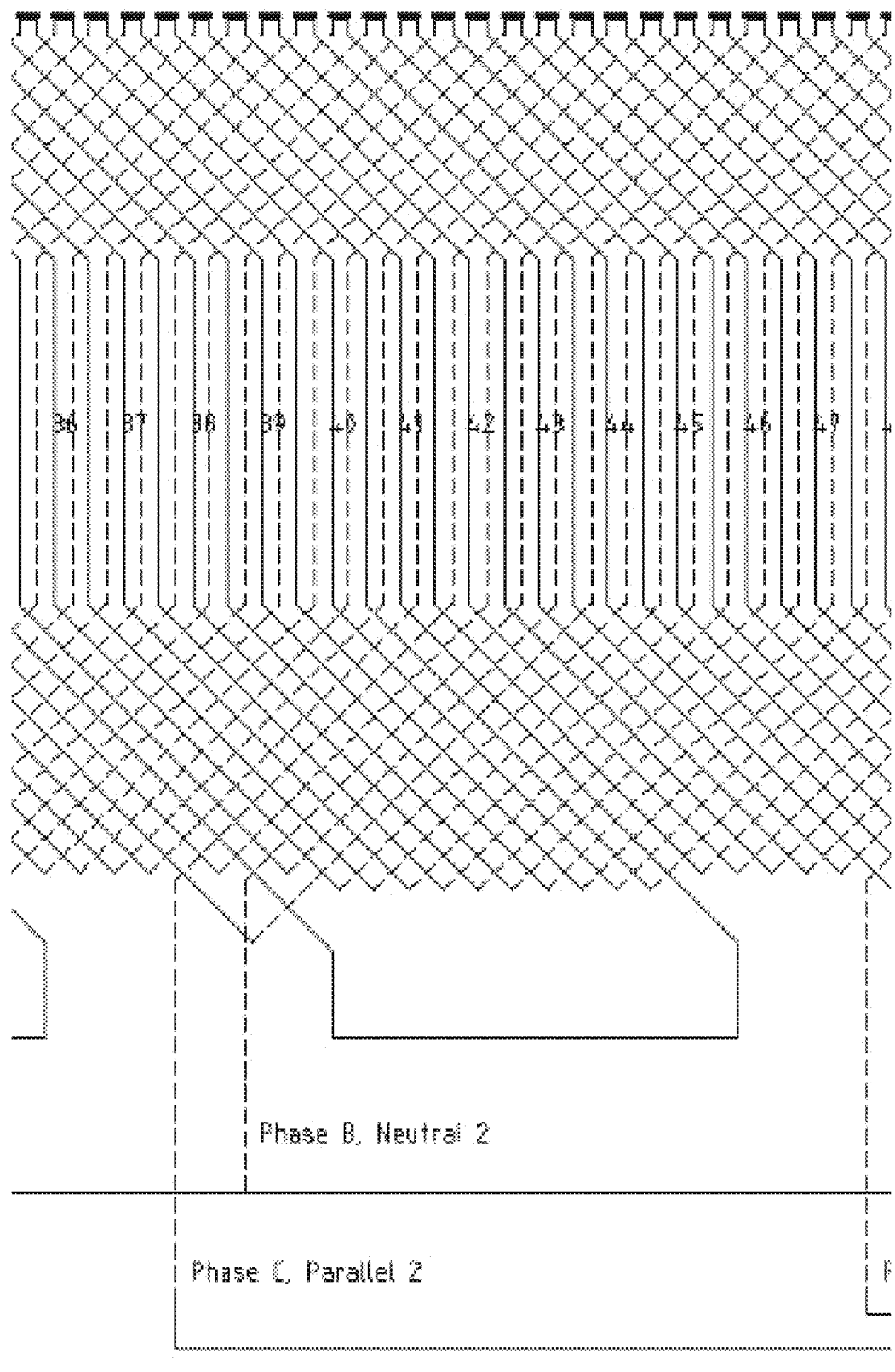
Figure 8F:
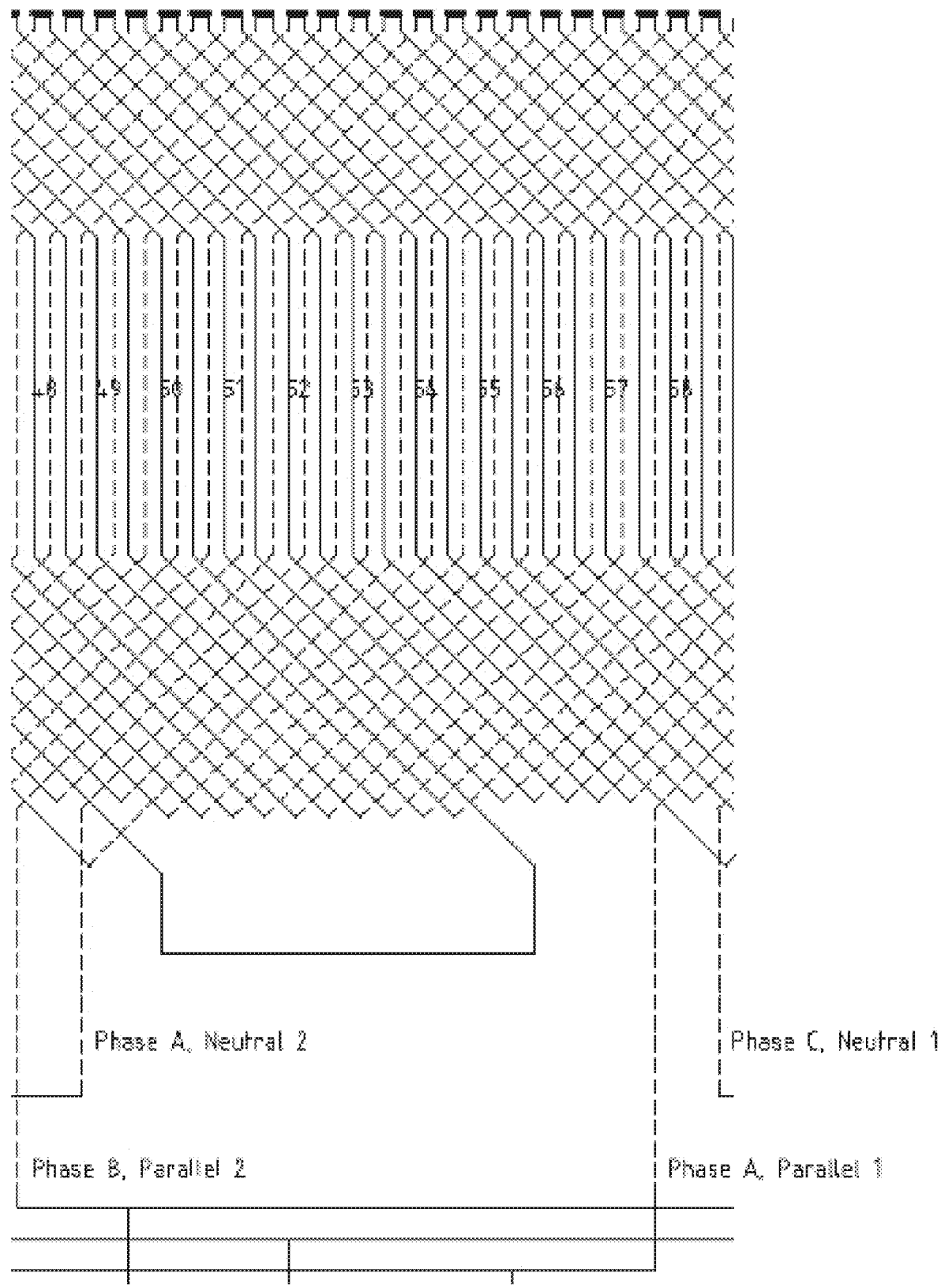

FIG. 8A illustrates a stator wiring schematic, in accordance with some examples, FIG. 8B, FIG. 8C, FIG. 8D, FIG. 8E, and FIG. 8F illustrate different portions of the stator wiring schematic in FIG. 8A, in accordance with some examples. The schematic in figure FIG. 8A shows each of the 4 layers of the winding. The connections between coils can be seen as well as the connections to the busbars and the neutral bus bar.

FIG. 9 illustrates a stator wiring table, in accordance with some examples. More specifically, FIG. 9. illustrates the contents of each stator slot, indicating the phase of each coil, which parallel circuit each coil belongs to, and the order of the connection.

Electrical Vehicle Examples

Figure 10:
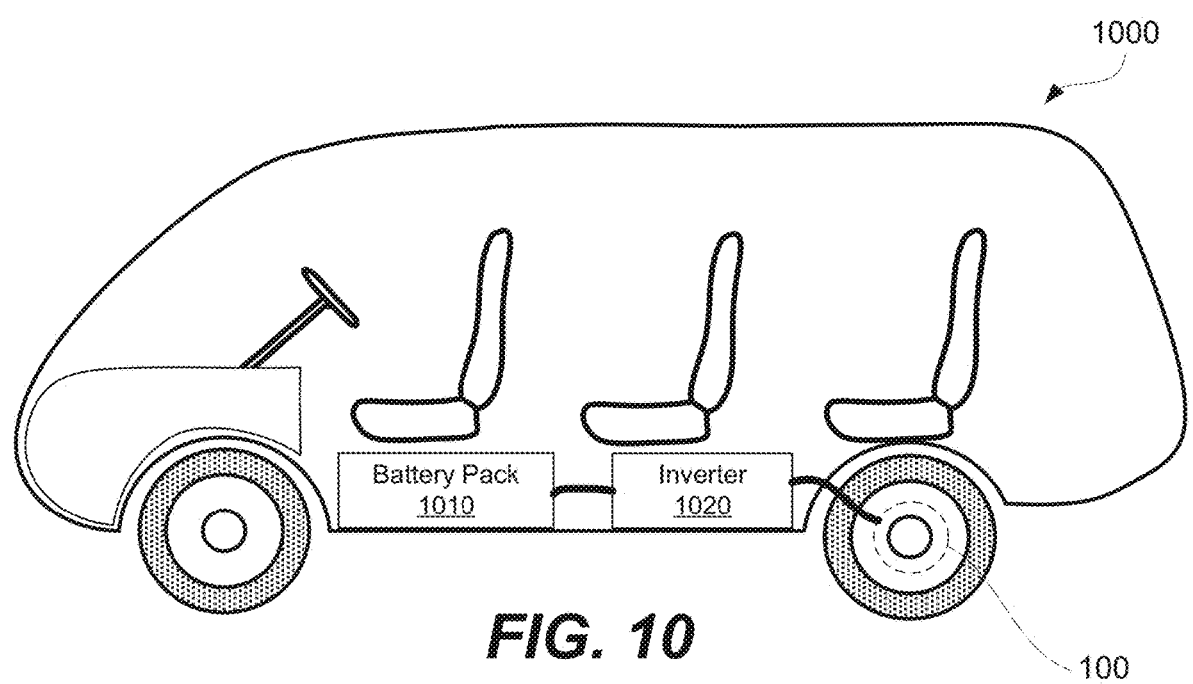
FIG. 10 is a schematic representation of an electric vehicle, comprising a fractional slot motor, in accordance with some examples.

One application of fractional slot electric motor 100 is electrical vehicles or, more specifically, hybrid electric vehicles, plug-in hybrid electric vehicles, and all-electric vehicles. For example, FIG. 10 is a schematic illustration of electric vehicle 1000, which comprises battery pack 1010, inverter 1020, and fractional slot electric motor 100. Other components of electric vehicle 1000 are not shown for simplicity. Battery pack 1010 is configured to receive energy received from inverter 1020 (e.g., from an external source, such as a charger, or regenerative braking of electric vehicle 1000) and store this electrical energy for future use. Furthermore, battery pack 1010 is configured to release the stored electrical energy to inverter 1020, e.g., to drive fractional slot electric motor 100 and to operate other systems of electric vehicle 1000 (e.g., heating-ventilation, lighting, and the like).

Further Examples

Further, the description includes examples according to the following clauses:

Clause 1. A fractional slot electric motor comprising:
a stator core, comprising a first side and a second side and stator slots, extending between the first side and the second side;
a coil, formed by coil elements, wherein:
each of the coil elements through one or two of the stator slots between the first side and the second side of the stator core,
each of the coil elements is electrically coupled to at least one other of the coil elements at the first side of the stator core, and
each of the coil elements has a rectangular cross-section; and
a lead assembly, comprising three phase busbars, wherein:
each of the phase busbars is electrically coupled to at least one of the coil elements at the second side of the stator core, and
each of the phase busbars comprises an external terminal (154) for connecting the fractional slot electric motor to an external power supply.

Clause 2. The fractional slot electric motor of clause 1, wherein the lead assembly further comprises two neutral busbars, each electrically coupled at least one the coil elements at the second side of the stator core.

Clause 3. The fractional slot electric motor of clause 2, wherein the neutral busbars and the phase busbars are stacked within the lead assembly and are electrically isolated from each other.

Clause 4. The fractional slot electric motor of clause 3, wherein the lead assembly comprises a busbar insulator, molded over each of the neutral busbars and the phase busbars and mechanically supporting the neutral busbars and the phase busbars with respect to each other.

Clause 5. The fractional slot electric motor of clause 4, wherein each of the phase busbars comprises one or more phase terminals, protruding from the busbar insulator and electrically coupled to one or more of the coil elements.

Clause 6. The fractional slot electric motor of clause 4, wherein each of the neutral busbars comprises one or more neutral terminals, protruding from the busbar insulator and electrically coupled to one or more of the coil elements.

Clause 7. The fractional slot electric motor of clause 4, wherein the lead assembly further comprises a busbar thermocouple, supported on the busbar insulator and thermally coupled to one of the phase busbars, partially protruding through the busbar insulator.

Clause 8. The fractional slot electric motor of any one of clauses 1-7, wherein each of the three phase busbars further comprises a hoop such that the external terminal is flexibly connected to the hoop.

Clause 9. The fractional slot electric motor of clause 8, wherein:
each of the three phase busbars further comprises a neck, flexibly connected to the hoop to the external terminal, and
the neck is formed by a plurality of metal strips.

Clause 10. The fractional slot electric motor of clause 8, wherein the three phase busbars are stacked in the lead assembly.

Clause 11. The fractional slot electric motor of any one of clauses 1-10, wherein the coil elements comprise looped coil elements and extended coil elements such that the looped coil elements are only connected at the first side of the stator core while the extended coil elements are connected at both the first side and the second side of the stator core.

Clause 12. The fractional slot electric motor of clause 11, wherein:
each of the looped coil elements comprises an end loop and two loop extensions, interconnected by the end loop and each terminating with loop extension end,
the loop extension end of each of the two loop extensions extends from the stator core at the first side and connected to one of the coil elements, and
the end loop extends from the stator core at the second side between two different ones of the stator slots.

Clause 13. The fractional slot electric motor of clause 12, wherein the end loop of each of the looped coil elements is positioned between the second side of the stator core and the lead assembly.

Clause 14. The fractional slot electric motor of clause 12, wherein the two loop extensions of one of the of the looped coil elements extend through the two different ones of the stator slots at same positions.

Clause 15. The fractional slot electric motor of clause 12, wherein the two loop extensions of one of the of the looped coil elements extend through the two different ones of the stator slots at different positions.

Clause 16. The fractional slot electric motor of clause 11, wherein:
each of the extended coil elements comprises a first end, an extension, and a second end,
the extension protrudes through the stator core between the first side and the second side and interconnects the first end and the second end,
the first end extends from the stator core at the first side and is connected to one of the coil elements, and
the second end extends from the stator core at the second side and is connected to one of the coil elements or the lead assembly.

Clause 17. The fractional slot electric motor of clause 16, wherein the second end of each of the extended coil elements is at least partially protrudes past the lead assembly.

Clause 18. The fractional slot electric motor of clause 16, wherein the second end is radially offset relative to the extension.

Clause 19. The fractional slot electric motor of any one clauses 1-18, wherein the coil elements are arranged into in a three-phase, two-parallel configuration.

Clause 20. The fractional slot electric motor of any one of clause 1-19, wherein the rectangular cross-sectional of each of the coil elements has a thickness of between 3.0 millimeters and 4.0 millimeters and a width of between 2.5 millimeters and 3.5 millimeters.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A fractional slot electric motor comprising:
a stator core, comprising a first side, a second side, and stator slots, extending between the first side and the second side;
a coil, formed by coil elements comprising looped coil elements and extended coil elements, the coil elements protruding through the stator core, wherein:
each of the looped coil elements protrudes through two of the stator slots and is directly connected to two other corresponding ones of the coil elements at the first side of the stator core;
at least one of the looped coil elements comprises loop extensions and an end loop, interconnecting the loop extensions and extending from the second side of the coil elements, the end loop having no radial offset relative to the loop extensions,
each of the coil elements has a rectangular cross-section; and
a lead assembly, comprising three phase busbars, wherein:
each of the three phase busbars is electrically coupled to at least one of the coil elements at the second side of the stator core, and
each of the three phase busbars comprises an external terminal for connecting the fractional slot electric motor to an external power supply.

2. The fractional slot electric motor of claim 1, wherein the lead assembly further comprises two neutral busbars, each electrically coupled to at least one of the coil elements at the second side of the stator core.

3. The fractional slot electric motor of claim 2, wherein the two neutral busbars and the three phase busbars are stacked within the lead assembly and are electrically isolated from each other.

4. The fractional slot electric motor of claim 3, wherein the lead assembly comprises a busbar insulator, molded over each of the two neutral busbars and the three phase busbars and mechanically supporting the two neutral busbars and the three phase busbars with respect to each other.

5. The fractional slot electric motor of claim 4, wherein each of the three phase busbars comprises one or more phase terminals, protruding from the busbar insulator and electrically coupled to one or more of the coil elements.

6. The fractional slot electric motor of claim 4, wherein each of the two neutral busbars comprises one or more neutral terminals, protruding from the busbar insulator and electrically coupled to one or more of the coil elements.

7. The fractional slot electric motor of claim 4, wherein the lead assembly further comprises a busbar thermocouple, supported on the busbar insulator and thermally coupled to one of the three phase busbars, partially protruding through the busbar insulator.

8. The fractional slot electric motor of claim 1, wherein each of the three phase busbars further comprises a hoop such that the external terminal is flexibly connected to the hoop.

9. The fractional slot electric motor of claim 8, wherein:
each of the three phase busbars further comprises a neck, flexibly connected to the hoop to the external terminal, and
the neck is formed by a plurality of metal strips.

10. The fractional slot electric motor of claim 8, wherein the three phase busbars are stacked in the lead assembly.

11. The fractional slot electric motor of claim 1, wherein the extended coil elements are connected at both the first side and the second side of the stator core.

12. The fractional slot electric motor of claim 11, wherein:
each of the looped coil elements comprises an end loop and two loop extensions, interconnected by the end loop and each terminating with loop extension end,
the loop extension end of each of the two loop extensions extends from the stator core at the first side and connected to one of the coil elements, and
the end loop extends from the stator core at the second side between two different ones of the stator slots.

13. The fractional slot electric motor of claim 12, wherein the end loop of each of the looped coil elements is positioned between the second side of the stator core and the lead assembly.

14. The fractional slot electric motor of claim 12, wherein the two loop extensions of one of the of the looped coil elements extend through the two different ones of the stator slots at same positions.

15. The fractional slot electric motor of claim 12, wherein the two loop extensions of one of the looped coil elements extend through the two different ones of the stator slots at different positions.

16. The fractional slot electric motor of claim 11, wherein:
each of the extended coil elements comprises a first end, an extension, and a second end,
the extension protrudes through the stator core between the first side and the second side and interconnects the first end and the second end,
the first end extends from the stator core at the first side and is connected to one of the coil elements, and
the second end extends from the stator core at the second side and is connected to one of the coil elements or the lead assembly.

17. The fractional slot electric motor of claim 16, wherein the second end of each of the extended coil elements is at least partially protrudes past the lead assembly.

18. The fractional slot electric motor of claim 15, wherein the second end is radially offset relative to the extension.

19. The fractional slot electric motor of claim 1, wherein the coil elements are arranged into a three-phase two-parallel configuration.

20. The fractional slot electric motor of claim 1, wherein the rectangular cross-sectional of each of the coil elements has a thickness of between 3.0 millimeters and 4.0 millimeters and a width of between 2.5 millimeters and 3.5 millimeters.

* * * * *